(12) United States Patent
Sundararajan et al.

(10) Patent No.: US 12,092,048 B2
(45) Date of Patent: Sep. 17, 2024

(54) SYSTEMS AND METHODS FOR CONTROLLING REGENERATION OF AFTERTREATMENT SYSTEMS INCLUDING MULTIPLE LEGS

(71) Applicant: Cummins Emission Solutions Inc., Columbus, IN (US)

(72) Inventors: Vikram Sundararajan, Columbus, IN (US); Jinqian Gong, Columbus, IN (US); Daniel D. Wilhelm, Sanibel, FL (US); Vijay Ramchandra Kadam, Columbus, IN (US); Kerang Wang, Columbus, IN (US); Todd A. Corbet, Franklin, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 211 days.

(21) Appl. No.: 17/691,893

(22) Filed: Mar. 10, 2022

(65) Prior Publication Data
US 2023/0287841 A1    Sep. 14, 2023

(51) Int. Cl.
*F01N 3/00* (2006.01)
*B01D 53/94* (2006.01)
(Continued)

(52) U.S. Cl.
CPC ....... *F02D 41/029* (2013.01); *B01D 53/9418* (2013.01); *B01D 53/944* (2013.01);
(Continued)

(58) Field of Classification Search
CPC ................. F02D 41/029; F02D 41/024; F02D 2200/0802; F02D 41/0235; F02D 41/025;
(Continued)

(56) References Cited

U.S. PATENT DOCUMENTS

| 7,587,892 B2 | 9/2009 | Dye et al. |
| 8,615,990 B2 | 12/2013 | Wilhelm et al. |

(Continued)

FOREIGN PATENT DOCUMENTS

| EP | 1 948 914 B1 | 7/2008 |
| EP | 3 037 637 B1 | 6/2016 |

(Continued)

OTHER PUBLICATIONS

Combined Search and Exam Report in GB2303193.3 dated Aug. 23, 2023.

*Primary Examiner* — Matthew T Largi
(74) *Attorney, Agent, or Firm* — Foley & Lardner LLP

(57) ABSTRACT

A controller for controlling regeneration in an aftertreatment system comprising a first leg and a second leg is configured to: determine whether regeneration is permitted by the engine based on engine operating parameters; in response to regeneration being permitted, determine whether regeneration is required in at least one of the first leg or the second leg based on operating parameters of the first leg and the second leg, and whether regeneration is inhibited in either the first leg or the second leg; and in response to determining that (i) regeneration is required in at least one of the first or second leg, and (ii) regeneration is not inhibited in either the first or the second leg, cause insertion of hydrocarbons into (Continued)

the engine to thereby increase the temperature of the exhaust gas to a target temperature and cause regeneration in each of the first and second leg.

18 Claims, 11 Drawing Sheets

(51) Int. Cl.
- *F01N 3/023* (2006.01)
- *F01N 3/10* (2006.01)
- *F01N 3/20* (2006.01)
- *F02D 41/02* (2006.01)

(52) U.S. Cl.
CPC ......... *B01D 53/9495* (2013.01); *F01N 3/023* (2013.01); *F01N 3/103* (2013.01); *F01N 3/2066* (2013.01); *F02D 41/024* (2013.01); *F02D 2200/0802* (2013.01)

(58) Field of Classification Search
CPC ............... F02D 41/1446; F02D 41/405; F02D 41/0245; F02D 41/027; B01D 53/9418; B01D 53/944; B01D 53/9495; F01N 3/023; F01N 3/103; F01N 3/2066; F01N 2260/04; F01N 2430/06; F01N 2430/085; F01N 2560/00; F01N 13/011; F01N 13/009; F01N 2560/06; F01N 2560/14; F01N 2900/08; F01N 3/0253; F01N 9/00; F01N 2610/03; F01N 2900/1404; F01N 9/002; F01N 2900/1602
See application file for complete search history.

(56) References Cited

U.S. PATENT DOCUMENTS

| | | | |
|---|---|---|---|
| 2002/0112472 A1* | 8/2002 | Tashiro | F02D 41/029 60/297 |
| 2008/0104948 A1 | 5/2008 | Kapparos et al. | |
| 2008/0155965 A1 | 7/2008 | Henderson et al. | |
| 2009/0019831 A1* | 1/2009 | Heibel | F01N 3/021 60/274 |
| 2009/0188243 A1 | 7/2009 | Williams et al. | |
| 2011/0023460 A1* | 2/2011 | Singh | F01N 13/009 60/297 |
| 2011/0047973 A1* | 3/2011 | Wilhelm | F01N 3/035 60/287 |
| 2012/0204537 A1* | 8/2012 | Dea | F01N 3/287 60/287 |
| 2014/0010744 A1* | 1/2014 | Ruona | F01N 3/208 422/105 |
| 2014/0116027 A1* | 5/2014 | Ancimer | F01N 3/2066 60/287 |
| 2014/0150411 A1* | 6/2014 | Golin | F01N 3/208 60/286 |
| 2018/0223755 A1* | 8/2018 | Shock | F01N 3/023 |

FOREIGN PATENT DOCUMENTS

| | | |
|---|---|---|
| GB | 2 452 383 A | 3/2009 |
| JP | 2003-214159 A | 7/2003 |
| JP | 2019031928 A * | 2/2019 |
| WO | WO-2006/125151 A2 | 11/2006 |
| WO | WO-2009/134895 A2 | 11/2009 |

* cited by examiner

SYSTEMS AND METHODS FOR CONTROLLING REGENERATION OF AFTERTREATMENT SYSTEMS INCLUDING MULTIPLE LEGS

TECHNICAL FIELD

The present disclosure relates generally to aftertreatment systems for use with internal combustion (IC) engines.

BACKGROUND

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst formulated to convert NOx (NO and $NO_2$ in some fraction) into harmless nitrogen gas ($N_2$) and water vapor ($H_2O$) in the presence of ammonia ($NH_3$).

Generally, a reductant such as a diesel exhaust fluid (e.g., an aqueous urea solution) is inserted into the aftertreatment system as a source of ammonia. The reductant facilitates the decomposition of the constituents of the exhaust gas by the SCR catalyst. During use, the reductant may be deposited on the SCR catalyst. Over time, the reductant deposits can build up and lead to reduction in a SCR catalytic conversion efficiency (CE) of the SCR catalyst. Heat may be requested from the engine to heat the exhaust gas to remove the reductant deposits and regenerate the SCR catalyst. Moreover, filters included in aftertreatment systems can also be plugged with particulate matter, and may also be regenerated during the regeneration process.

Some aftertreatment systems include two or more legs, each of which includes various components of the aftertreatment system. Exhaust gas generated by the engine is divided into portions that flow into each leg of the aftertreatment system. Conventional aftertreatment systems insert hydrocarbons in each of the legs of the aftertreatment system to cause regeneration. While this allows independent control of regeneration in each leg, such aftertreatment systems may increase hardware requirements.

SUMMARY

Embodiments described herein relate generally to systems and methods for regeneration in aftertreatment systems that include a first leg and a second leg, and in particular, to aftertreatment systems that include a controller configured to determine whether regeneration is required by a SCR catalyst and/or a filter disposed in in either of the first leg or the second leg of the aftertreatment system, and initiate regeneration in each of the first leg and the second leg to cause regeneration in each leg when one of the legs requires regeneration, and stop regeneration once each leg has completed regeneration.

In some embodiments, a controller for controlling regeneration of at least one of a SCR catalyst or a filter included in a first leg or a second leg of an aftertreatment system, the first leg structured to receive a first portion of an exhaust gas produced by an engine, and the second leg structured to receive a second portion of the exhaust gas, is configured to: determine whether regeneration is permitted by the engine based on engine operating parameters; in response to determining that regeneration is permitted by the engine, determine whether, regeneration is being required in at least one of the first leg or the second leg based on operating parameters of the first leg and the second leg, and whether regeneration is inhibited in either the first leg or the second leg; and in response to determining that (i) regeneration is required in at least one of the first leg or the second leg, and (ii) regeneration is not inhibited in either the first leg or the second leg, cause insertion of hydrocarbons into the engine to thereby increase the temperature of the exhaust gas to a target temperature and cause regeneration in each of the first leg and the second leg.

In some embodiments, a method for controlling regeneration of at least one of a SCR catalyst or a filter included in a first leg or a second leg of an aftertreatment system, the first leg structured to receive a first portion of an exhaust gas produced by an engine, and the second leg structured to receive a second portion of the exhaust gas, comprises: determining, by a controller coupled to each of the first leg and the second leg of the aftertreatment system, whether regeneration is permitted by the engine based on engine operating parameters; in response to determining, by the controller, that regeneration is permitted by the engine, determining, by the controller, whether regeneration is required in at least one of the first leg or the second leg based on operating parameters of the first leg and the second leg, and whether regeneration is inhibited in either the first leg or the second leg; and in response to determining, by the controller, that (i) regeneration is required in at least one of the first leg or the second leg, and (ii) regeneration is not inhibited in either the first leg or the second leg, causing insertion of hydrocarbons, by the controller, into the engine to thereby increase the temperature of the exhaust gas to a target temperature and cause regeneration in each of the first leg and the second leg.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
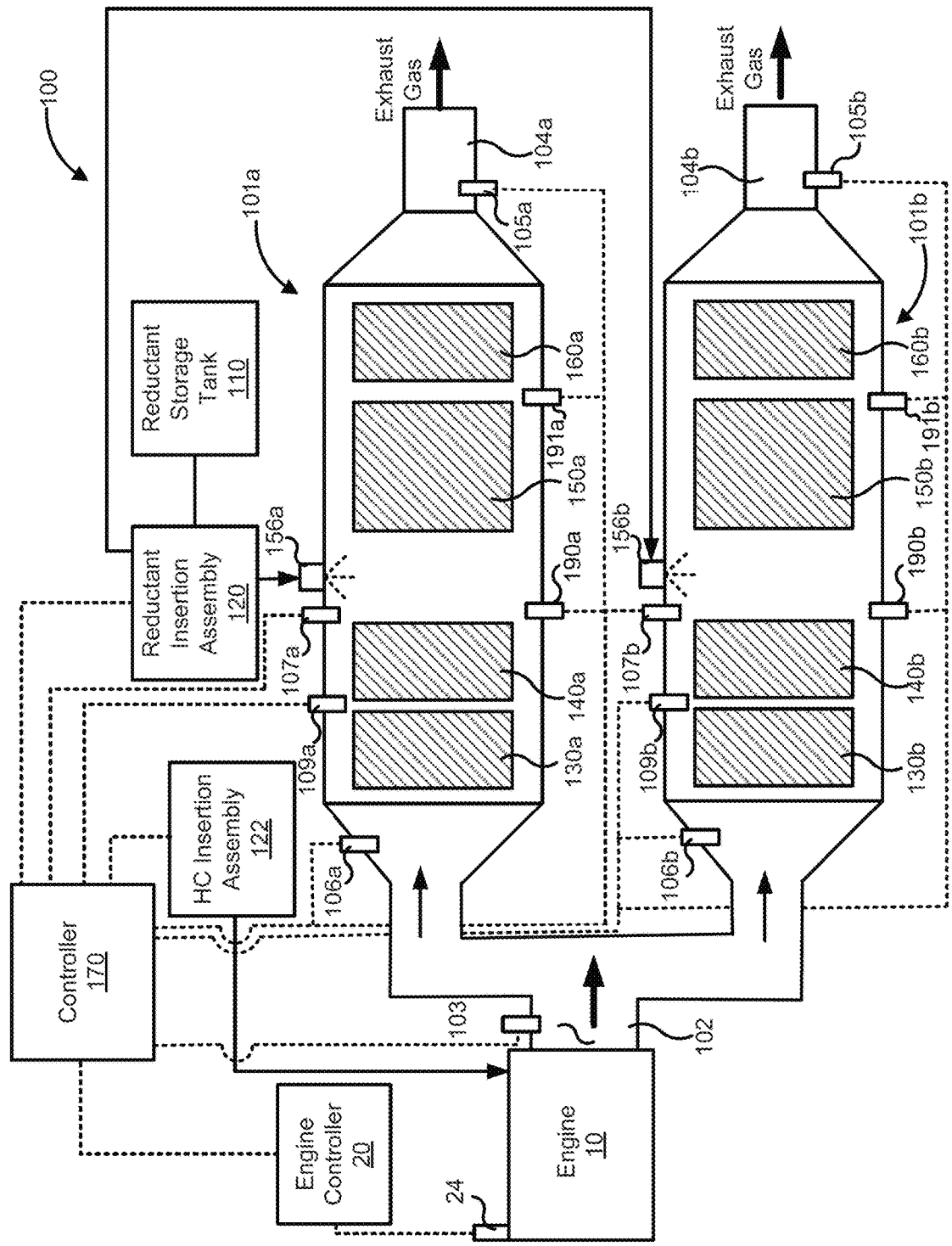
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for controlling regeneration in aftertreatment systems that include a first leg and a second leg, and in particular, to aftertreatment systems that include a controller configured to determine whether regeneration is required by a SCR catalyst and/or filter disposed in in either of the first leg or the second leg of the aftertreatment system, and initiate regeneration in each of the first leg and the second leg to cause regeneration in each leg when one of the leg requests regeneration, and stop regeneration once each leg has completed regeneration.

Some aftertreatment systems include two or more legs, each of which includes various components of the aftertreatment system. Exhaust gas generated by the engine is divided into portions that flow into each leg of the aftertreatment system. Conventional aftertreatment systems insert hydrocarbons in each of the legs of the aftertreatment system to cause regeneration of filters (i.e., heating to a temperature sufficient to remove accumulated particulate matter in the filters) and/or regeneration of SCR catalysts (i.e., heating to remove reductant deposits, particulate matter, or otherwise regain catalytic conversion efficiency) disposed in the respective legs of the aftertreatment system. While this allows independent control of regeneration in each leg, such aftertreatment systems may increase hardware requirements. For example, such aftertreatment systems generally include separate controllers for controlling regeneration of the legs, and separate hydrocarbon insertion assemblies for inserting hydrocarbons in the legs, increasing manufacturing cost and complexity In contrast, aftertreatment system describes herein achieve regeneration in each leg of the aftertreatment system by inserting hydrocarbons directly into the engine, for example, increasing the fuel to air ratio of an air/fuel mixture provided to the engine, which causes the engine to run richer and thereby increases the temperature of the exhaust gas and causes regeneration. Each leg of the aftertreatment system may require regeneration at different times, and may have different regeneration needs, but inserting hydrocarbons into the engine increases the temperature of the exhaust gas flowing into each leg, thereby causing regeneration in each of the legs of the aftertreatment system.

Embodiments of the systems and methods described herein for controlling regeneration in aftertreatment systems that include a first leg and a second leg may provide one or more benefits including, for example: (1) controlling regeneration in each leg of the aftertreatment system using a single controller, thereby reducing system complexity; (2) obviating the need for separate insertion assemblies for inserting hydrocarbons in each leg, thereby reducing manufacturing complexity and cost; (3) ensuring that regeneration occurs when any one of the leg is requesting regeneration to prevent reduction in catalytic conversion efficiency of the aftertreatment system; and (4) determining and setting target temperatures, feedback temperatures, and HC slip limits to optimize regeneration in each leg while inhibiting hydrocarbon slip.

As described herein, the term "regeneration in a leg" or variants thereof should be understood to mean regeneration of a SCR catalyst and/or a filter (e.g., diesel particulate filter (DPF)) disposed in a respective leg of the aftertreatment system.

FIG. 1 is a schematic illustration of an aftertreatment system 100 coupled to an engine 10, according to an embodiment. The aftertreatment system 100 includes a first leg 101a and a second leg 101b (e.g., two banks of the aftertreatment system 100), each of which is configured to receive a portion of an exhaust gas (e.g., diesel exhaust gas) produced by the engine 10 and treat constituents (e.g., $NO_x$, CO, $CO_2$) of the exhaust gas. The aftertreatment system 100 includes a reductant storage tank 110, a reductant insertion assembly 120, a hydrocarbon insertion assembly 122, and a controller 170. Moreover, the first leg 101a includes a SCR catalyst 150*a*, an oxidation catalyst 130*a*, a filter 140*a*, and optionally an ammonia oxidation ($AMO_X$) catalyst 160*a*, and the second leg 101*b* includes a SCR catalyst 150*b*, an oxidation catalyst 130*b*, a filter 140*b*, and optionally an ammonia oxidation ($AMO_X$) catalyst 160*b*.

The engine 10 may include, for example, a diesel engine, a gasoline engine, a natural gas engine, a dual fuel engine, a biodiesel engine, an E-85 engine, or any other suitable engine. The engine 10 combusts fuel and generates an exhaust gas that includes $NO_X$, CO, $CO_2$, and other constituents. An engine controller 20 may be communicatively coupled to engine 10. The engine controller 20 is configured to receive information from an engine sensor 24 to determine various engine parameters and control operations of the engine 10 (e.g., adjust engine speed, engine torque, operate engine in lean operation mode or rich operation mode, cause insertion of hydrocarbons in engine 10, etc.). Such engine parameters may include at least one of, but not limited to, an engine coolant temperature of a coolant of the engine 10, an exhaust gas mass flow rate of an exhaust gas generated by the engine 10, an engine torque of the engine 10, an engine speed of the engine 10, or an engine failure signal (e.g., an engine fault code) associated with the engine 10. While shown as being a single sensor, the engine sensor 24 may include a set of engine sensors, each of which is configured to measure one or more of the engine parameters. In some embodiments, a hydrocarbon insertion assembly 122 may be coupled to the engine 10 and configured to insert hydrocarbons into the engine 10 to adjust temperature of the exhaust gas being generated by the engine 10 based on a signal received from the controller 170. In some embodiments, the hydrocarbon insertion assembly 122 may also be configured to insert hydrocarbons into the aftertreatment system 100 upstream of the oxidation catalyst 130, for example, to also assist in increasing the temperature of the exhaust gas.

The legs 101*a/b* may include a housing within which components of the aftertreatment system 100 are disposed. The housing may be formed from a rigid, heat-resistant and corrosion-resistant material, for example, stainless steel, iron, aluminum, metals, ceramics, or any other suitable material. The housing may have any suitable cross-section, for example, circular, square, rectangular, oval, elliptical, polygonal, or any other suitable shape.

An inlet conduit 102 is fluidly coupled to an exhaust of the engine 10 and configured to receive exhaust gas from the engine and divide the exhaust gas into a first portion delivered to the first leg 101*a* and a second portion delivered to the second leg 101*b*. Furthermore, an outlet conduit 104*a* may be coupled to an outlet of the housing of the first leg 101*a* and an outlet conduit 104*b* may be coupled to an outlet of the housing of the second leg 101*b*, and structured to expel treated first and second portions of the exhaust gas into the environment (e.g., treated to remove particulate matter such as soot by the filters 140*a/b* and/or reduce constituents of the exhaust gas such as NOx gases, CO, unburnt hydrocarbons, etc. included in the exhaust gas by the SCR catalysts 150*a/b* and the oxidation catalysts 130*a/b*).

A first sensor 103 may be positioned in the inlet conduit 102. The first sensor 103 may comprise a NOx sensor configured to measure an amount of NOx gases included in the exhaust gas flowing into the legs 101*a/b*, and may include a physical sensor and/or a virtual sensor. In various embodiments, a temperature sensor, a pressure sensor, an oxygen sensor or any other sensor may also be positioned in the inlet conduit 102 so as to determine one or more operational parameters of the exhaust gas flowing through the aftertreatment system 100.

A first oxidation catalyst inlet temperature sensor 106*a* is disposed at the inlet of the oxidation catalyst 130*a* of the first leg 101*a*, and a second oxidation catalyst inlet temperature sensor 106*b* is disposed at the inlet of the oxidation catalyst 130*b* of the second leg 101*b*, and are configured to measure a feedback temperature at the inlet of the oxidation catalysts 130*a/b*, respectively. The controller 170 may utilize the temperature of the exhaust gas provided to the oxidation catalysts 130*a/b* to determine an amount of heat energy needed (e.g., associated with a quantity of hydrocarbons to dose).

In some embodiments, the controller 170 determines if the temperature of the exhaust gas provided to the first oxidation catalyst 130*a* is approximately equal to the temperature of the exhaust gas provided to the second oxidation catalyst 130*b*. If the temperatures are approximately equal, then the amount of heat energy is determined. If the temperatures are not approximately equal, then the controller 170 waits to determine the amount of heat energy until the temperatures are approximately equal (e.g., regardless of whether the temperatures measured by other sensors in the first leg 101*a* are equal to corresponding sensors in the second leg 101*b*, etc.).

A second sensor 105*a/b* may be positioned in the outlet conduit 104*a/b* of each leg 101*a/b*. The second sensors 105*a/b* may comprise second NOx sensors configured to determine an amount of NOx gases expelled into the environment after passing through the SCR catalysts 150*a/b*. In other embodiments, the second sensors 105*a/b* may comprise a particulate matter sensor configured to determine an amount of particulate matter (e.g., soot included in the exhaust gas exiting the filters 140*a/b*) in the exhaust gas being expelled into the environment. In still other embodiments, the second sensors 105*a/b* may comprise an ammonia sensor configured to measure an amount of ammonia in the exhaust gas flowing out of the SCR catalysts 150*a/b*, i.e., determine the ammonia slip. This may be used as a measure of a catalytic conversion efficiency of the SCR catalysts 150*a/b* for adjusting an amount of reductant to be inserted into the SCR catalysts 150*a/b*, and/or adjusting a temperature of the SCR catalysts 150*a/b* so as to allow the SCR catalysts 150*a/b* to effectively use the ammonia for catalytic decomposition of the NOx gases included in the exhaust gas flowing therethrough. The $AMO_X$ catalysts 160*a/b* may be positioned downstream of the SCR catalysts 150*a/b* so as to decompose any unreacted ammonia in the exhaust gas downstream of the SCR catalysts 150*a/b*.

The oxidation catalysts 130*a/b* may be positioned upstream of the SCR catalysts 150*a/b* and configured to decompose unburnt hydrocarbons and/or CO included in the exhaust gas. In some embodiments, the oxidation catalysts 130*a/b* may include a diesel oxidation catalyst. The oxidation catalysts 130*a/b* may catalyze the combustion of the hydrocarbons that may be included in the exhaust gas emitted by the engine 10 (e.g., due to hydrocarbons being inserted by the hydrocarbon insertion assembly 122 into the engine 10) which increases the temperature of the exhaust gas. Heating the exhaust gas may be used to regenerate the filters 140*a/b* by burning off particulate matter that may have accumulated on the filters 140*a/b*, and/or regenerate the SCR catalysts 150*a/b* by evaporating reductant deposits deposited on the SCR catalysts 150*a/b*. A first oxidation catalyst outlet temperature sensor 109*a* is disposed at the outlet of the oxidation catalyst 130*a* of the first leg 101*a*, and a second oxidation catalyst outlet temperature sensor 109*b* is disposed at the outlet of the oxidation catalyst 130b of the second leg 101b, and are configured to measure a feedback temperature at the outlet of the oxidation catalysts 130a/b, respectively. The first oxidation catalyst outlet temperature sensor 109a also functions to measure a feedback temperature at an inlet of the first filter 140a, and the second oxidation catalyst outlet temperature sensor 109b also functions to measure a feedback temperature at an inlet of the second filter 140b.

The filters 140a/b are disposed downstream of the corresponding oxidation catalysts 130a/b and upstream of the SCR catalysts 150a/b and configured to remove particulate matter (e.g., soot, debris, inorganic particles, etc.) from the exhaust gas. In various embodiments, the filters 140a/b may include a ceramic filter. In some embodiments, the filters 140a/b may include a cordierite filter which can, for example, be an asymmetric filter. In yet other embodiments, the filters 140a/b may be catalyzed. In some embodiments, pressure sensors 107a/b may be disposed at an outlet of the corresponding filters 140a/b and configured to measure a filter outlet pressure at an outlet of the filters 140a/b. In other embodiments, the pressure sensors 107a/b may include a differential pressure sensor disposed across the filters 140a/b and configured to measure a differential pressure across the filters 140a/b. The filter outlet pressure or differential pressure may be indicative of a plugging of the filters 140a/b and/or the SCR catalysts 150a/b.

The SCR catalysts 150a/b is formulated to decompose constituents of an exhaust gas flowing therethrough in the presence of a reductant, as described herein. In some embodiments, the SCR catalysts 150a/b may include a selective catalytic reduction filter (SCRF). Any suitable SCR catalyst 150a or 150b may be used such as, for example, platinum, palladium, rhodium, cerium, iron, manganese, copper, vanadium based catalyst, any other suitable catalyst, or a combination thereof. The SCR catalysts 150a/b may be disposed on a suitable substrate such as, for example, a ceramic (e.g., cordierite) or metallic (e.g., kanthal) monolith core which can, for example, define a honeycomb structure. A washcoat can also be used as a carrier material for the SCR catalysts 150a/b. Such washcoat materials may comprise, for example, aluminum oxide, titanium dioxide, silicon dioxide, any other suitable washcoat material, or a combination thereof.

Although FIG. 1, shows each of the first leg 101a and the second leg 101b as including only the oxidation catalysts 130a/b, the filters 140a/b, the SCR catalysts 150a/b and the AMO$_X$ catalysts 160a/b, in other embodiments, a plurality of aftertreatment components may be included in each leg 101a/b in addition to the oxidation catalysts 130a/b, the filters 140a/b, the SCR catalysts 150a/b and the AMO$_X$ catalysts 160a/b. Such aftertreatment components may comprise, for example, mixers, baffle plates, secondary filters (e.g., a secondary partial flow or catalyzed filter) or any other suitable aftertreatment component.

Reductant ports 156a/b may be positioned on a sidewall of the housing of each of the legs 101a/b and structured to allow insertion of a reductant therethrough into the internal volume defined by the housing of each of the legs 101a/b. The reductant ports 156a/b may be positioned upstream of the SCR catalysts 150a/b (e.g., to allow reductant to be inserted into the exhaust gas upstream of the SCR catalysts 150a/b) or over the SCR catalysts 150a/b (e.g., to allow reductant to be inserted directly on the SCR catalysts 150a/b). In other embodiments, the reductant ports 156a/b may be disposed on the inlet conduit 102 and configured to insert the reductant into the inlet conduit 102 upstream of the SCR catalysts 150a/b. In such embodiments, mixers, baffles, vanes or other structures may be positioned in the inlet conduit 102 so as to facilitate mixing of the reductant with the exhaust gas.

The reductant storage tank 110 is structured to store a reductant. The reductant is formulated to facilitate decomposition of the constituents of the exhaust gas (e.g., NOx gases included in the exhaust gas). Any suitable reductant may be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name) ADBLUE®. For example, the reductant may comprise an aqueous urea solution having a particular ratio of urea to water. In some embodiments, the reductant can comprise an aqueous urea solution including 32.5% by weight of urea and 67.5% by weight of deionized water, including 40% by weight of urea and 60% by weight of deionized water, or any other suitable ratio of urea to deionized water A reductant insertion assembly 120 is fluidly coupled to the reductant storage tank 110. The reductant insertion assembly 120 is configured to selectively insert the reductant into the SCR catalyst 150a/b or upstream thereof (e.g., into the inlet conduit 102) or a mixer (not shown) positioned upstream of the SCR catalysts 150a/b. The reductant insertion assembly 120 may comprise various structures to facilitate receipt of the reductant from the reductant storage tank 110 and delivery to the SCR catalysts 150a/b, for example, pumps, valves, screens, filters, etc.

The aftertreatment system 100 may also comprise a reductant injector fluidly coupled to the reductant insertion assembly 120 and configured to insert the reductant (e.g., a combined flow of reductant and compressed air) into the SCR catalysts 150a/b. In various embodiments, the reductant injector may comprise a nozzle having predetermined diameter. In various embodiments, the reductant injector may be positioned in the reductant port 156 and structured to deliver a stream or a jet of the reductant into the legs 101a/b so as to deliver the reductant to the SCR catalysts 150a/b.

The controller 170 is operatively coupled to the reductant insertion assembly 120, the hydrocarbon insertion assembly 122, the first sensor 103, the second sensors 105a/b, pressure sensors 107a/b, the oxidation catalyst outlet temperature sensors 109a/b, and the engine controller 20. The controller 170 is coupled to the various sensors included in each of the first leg 101a and the second leg 101b to determine operating parameters of the first leg 101a and the second leg 101b. For example, the controller 170 may be communicatively coupled to the first sensor 103 and may be configured to receive a first sensor signal from the first sensor 103, for example, to determine an amount of NOx gases included in the exhaust gas entering the aftertreatment system 100, an oxidation catalyst inlet temperature at inlet of the oxidation catalysts 130a/b or other parameters of the exhaust gas or the aftertreatment system 100. The controller 170 may also be communicatively coupled to the second sensors 105a/b and may be configured to determine a concentration of NOx gases or ammonia included in the exhaust gas being expelled into the environment or other parameters of the exhaust gas.

The controller 170 may be configured to determine SCR catalytic conversion efficiencies of the SCR catalysts 150a/b based on the inlet NOx amount of NOx gases entering the aftertreatment system 100, and the outlet NOx amount of NOx gases exiting the first leg 101a and the second leg 101b, respectively. For example, the controller 170 may determine a difference between the inlet NOx amount and the outlet NOx amount and determine the SCR catalytic conversion efficiency of the SCR catalysts 150a/b based on the difference, and based on SCR catalytic conversion efficiency, determine if the SCR catalysts 150a/b require regeneration (e.g., need to be regenerated due to clogging by reductant deposits, or degeneration of a catalyst active material). The controller 170 may also be coupled to the pressure sensors 107a/b to receive a pressure signal (e.g., corresponding a filter outlet pressure or a differential pressure across the filters 140a/b) and determine whether the filter 140a or 140b requires regeneration (e.g., needs to be regenerated to unplug or unclog the filter 140a/b). The controller 170 may also be coupled to oxidation catalyst outlet temperature sensors 109a/b to determine feedback temperatures at the outlet of the oxidation catalysts 130a/b, which may be used by the controller 170 to set target temperatures for causing regeneration in each of the legs 101a/b.

The controller 170 may be operably coupled to the engine controller 20, the first sensor 103, the second sensors 105a/b, the pressure sensors 107a/b, the oxidation catalyst outlet temperature sensors 109a/b, the reductant insertion assembly 120, the hydrocarbon insertion assembly 122 and various components of the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

As shown in FIG. 1, exhaust gas emitted from the engine splits into a first portion that flows into the first leg 101a, and a second portion that flows into the second leg 101b. In conventional aftertreatment systems, hydrocarbons are independently inserted into each leg of an aftertreatment system to independently regenerate each leg of such aftertreatment systems as needed. In contrast, the hydrocarbon insertion assembly 122 is configured to insert hydrocarbons directly into the engine 10, which would cause increase in the temperature of the exhaust gas emitted by the engine 10, and thereby the first and second exhaust gas portions causing an increase in each of the legs 101a/b of the aftertreatment system 100. The controller 170 is configured to trigger or initiate regeneration based on operating conditions of each of the first leg 101a and the second leg 101b.

Expanding further, the controller 170 is configured to determine whether regeneration is permitted by the engine 10 based on engine operating parameters. For example, the controller 170 may receive engine operating parameters from the engine controller 20, which may be measured by an engine sensor 24. Such engine parameters may include, but are not limited to engine coolant temperature of a coolant of the engine 10, an exhaust gas mass flow rate of an exhaust gas generated by the engine 10, an engine torque of the engine 10, an engine speed of the engine 10, or an engine failure signal (e.g., an engine fault code) associated with the engine 10, any other suitable parameter or a combination thereof. For example, there may be certain conditions under which the engine 10 may not be able to perform regeneration (e.g., too high a torque or load on the engine, engine idling, too little fuel, or engine operating parameters being outside established thresholds, etc.). If the controller 170 determines that regeneration is not permitted by the engine 10, for example, based on a signal received from the engine controller 20, the controller 170 may abort regeneration.

In response to determining that regeneration is permitted by the engine 10, the controller 170 determines whether regeneration is required by at least one of the first leg 101a or the second leg 101b based on operating parameters of the first leg 101a and the second leg 101b, respectively, and whether regeneration is inhibited in either the first leg 101a or the second leg 101b, for example, based also on the operating parameters of the first leg 101a and the second leg 101b. The operating parameters of the legs 101a/b may include a pressure at the outlet of the filters 140a/b or across the filters 140a/b, NOx conversion efficiency at the second sensor 105a/b, or SCR catalysts 150a/b temperature, status of the various sensors included in the aftertreatment system 100, etc. In the present specification, the phrase "regeneration is required" or variants thereof means that a threshold condition has been satisfied which indicates that at least one of the SCR catalyst 150a or 150b, or at least one of the filters 140a or 140b would benefit from regeneration.

In some embodiments, regeneration may be inhibited in the first leg 101a and/or the second leg 101b. For example, the filters 140a/b or SCR catalysts 150a/b may have already failed, sensors 105a/b, 107a/b, 109a/b, or other sensors included in the aftertreatment system 100 may have malfunctioned, the hydrocarbon insertion assembly 122 or components thereof have malfunctioned, the reductant insertion assembly 120 or components thereof have malfunctioned, or there might be other operating conditions that inhibit regeneration (e.g., because of possibility of damage to aftertreatment components of the first leg 101a and/or second leg 101b, or NOx emissions exceeding allowable thresholds). In this situation, the controller 170 aborts regeneration.

On the contrary, if the controller 170 determines that (i) at least one of the first leg 101a or the second leg 101b requires regeneration, and (ii) regeneration is not inhibited in either the first leg 101a or the second leg 101b, the controller 170 is configured to cause insertion of hydrocarbons into the engine 10 to thereby increase the temperature of the exhaust gas to a target temperature and cause regeneration in each of the first leg 101a and the second leg 101b. That is once the controller 170 determines that one of the first leg 101a or the second leg 101b requires regeneration, the controller 170 may cause activation of the hydrocarbon insertion assembly 122 to insert hydrocarbons into the engine 10 (e.g., to cause the engine 10 to run rich and emit heated exhaust gas). Thus, regeneration is initiated in each of the legs 101a and 101b, even if only one of the legs 101a/b is requesting regeneration.

Figure 7A:
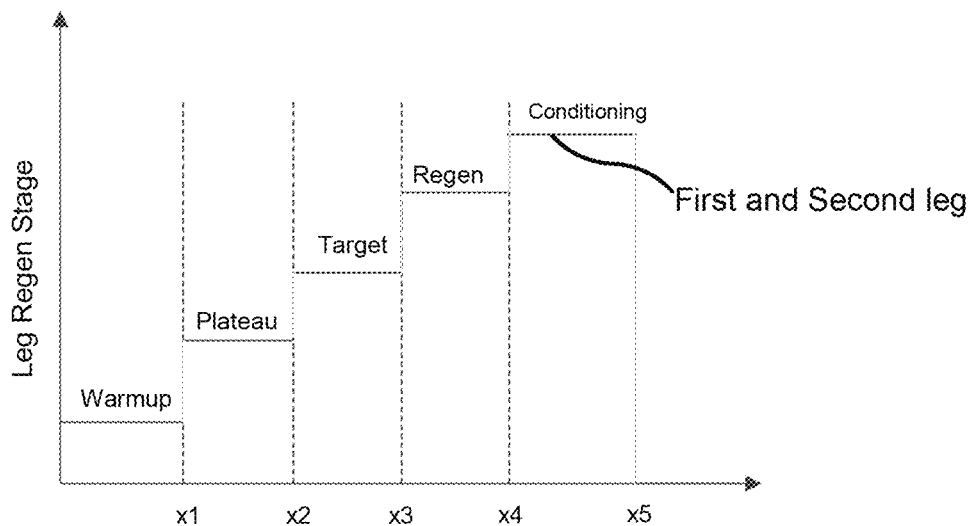
FIG. 7A is a plot of regeneration stages of first and second legs of the aftertreatment system of FIG. 1 at different time points, each of the two legs experiencing the various regeneration stage in sync with each other.

The controller 170 monitors a regeneration stage of each of the first leg 101a and the second leg 101b during regeneration, for example, based on feedback temperatures received from the first sensor 103, the oxidation catalyst outlet temperature sensor 109a, or temperature signals received from any temperature sensor configured to measure temperature of the SCR catalysts 150a/b. For example, FIG. 7A shows various regeneration stages of the aftertreatment system 100 in which both the first leg 101a and the second leg 101b experience the same regeneration stages at various time points (indicated on the x-axis as x1, x2, x3, x4, and x5).

Figure 8A:
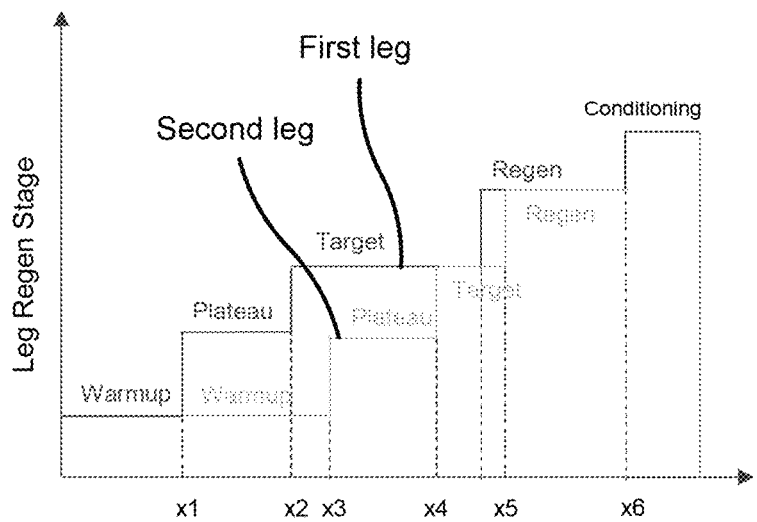
FIG. 8A is a plot of regeneration stages of first and second legs of the aftertreatment system of FIG. 1 at different time points, each of the two legs experiencing the various regeneration stage out of sync with each other.

The regeneration stages may include a warmup stage where a temperature of legs 101a/b is increased to a warm up temperature (e.g., 400-450 degrees Celsius for regeneration of a filter, 325-450 degrees Celsius for regeneration of a SCR catalyst), a plateau stage which occurs after the warmup stage and at which the temperature is held at the warmup temperature for a predetermined time period (e.g., 30-60 seconds for regeneration of a filter, 20-60 seconds for regeneration of a SCR catalyst), and a target regeneration stage which occurs after the plateau stage and at which the temperature of the aftertreatment system 100 is increased to the target temperature (e.g., 500-575 degrees Celsius for regeneration of a filter, 350-575 degrees Celsius for regeneration of a SCR catalyst). The regeneration stages also include a regen stage which occurs after the target regeneration stage at which the temperature of the legs 101a and 101b is held at or above (e.g., within ±10%) the target temperature to cause regeneration in each of the legs 101a/b. The regeneration stage also includes a conditioning stage which occurs after the target regeneration stage in which the temperature of the legs 101a/b is decreased to an initial temperature of the legs 101a/b, i.e., the temperature of the legs 101a/b before the warmup stage was started. FIG. 8A also shows another scenario in which the first leg 101 and the second leg 101b experience different regeneration stages at different times.

The controller 170 is configured to determine if regeneration is complete in each of the first leg 101a and the second leg 101b. Once the controller 170 determines that regeneration is complete in each of the first leg 101a and the second leg 101b, the controller 170 stops causing insertion of hydrocarbons into the engine 10 to stop regeneration in each of the first leg 101a and the second leg 101b.

The first leg 101a and the second leg 101b may require different regeneration that corresponds to different target temperatures at which the regeneration for that leg should be performed. For example, the controller 170 may determine based on the operating parameters of the first leg 101a that the first leg 101a is requires regeneration of the SCR catalyst 150a which may correspond to a first target temperature (e.g., 450-500 degrees Celsius, 400-450 degrees Celsius). In contrast, the controller 170 may determine based on the operating parameters of the second leg 101b that the second leg 101b requires regeneration of the filter 140b which may correspond to a second target temperature (e.g., 525-575 degrees Celsius, 450-575 degrees Celsius), which may be smaller or otherwise different from the first target temperature. Thus, regeneration in each of the legs 101a/b may demand a different target temperature for meeting its regeneration demand. Moreover, as shown in FIG. 8A, each of the first leg 101a and the second leg 101b may experience different regeneration stages at different time points, and therefore, the target temperature of the first leg 101a may be different from the target temperature of the second leg 101b.

For example, if both the first leg 101a and the second leg 101b are used in regeneration of a filter, then the first target temperature may be 450-500 degrees Celsius and the second target temperature may be 525-575 degrees Celsius. In another example, if both the first leg 101a and the second leg 101b are used in regeneration of a filter, the first target temperature may be 400-450 degrees Celsius and the second target temperature may be 450-575 degrees Celsius. Such an example may be useful where the second leg 101b is finishing its plateau stage and the first leg 101a is ready to move on from the plateau stage.

The controller 170 is configured to set a target temperature for controlling regeneration based on the target temperatures of each of the first leg 101a and the second leg 101b. For example, the controller 170 may monitor a regeneration stage of each of the first leg 101a and the second leg 101b. In response to each of the first leg 101a and the second leg 101b being at a regeneration stage that corresponds to the plateau stage or a regeneration stage that occurs after the plateau stage, the controller 170 is configured to set the target temperature as the smaller of the first target temperature of the first leg 101a and the second target temperature of the second leg 101b. For example, if a second target temperature of the second leg 101b is less than a first target temperature of the first leg 101a, the controller sets the target temperature as the second target temperature.

However, in response to one of the first leg 101a or the second leg 101b being at a regeneration stage that occurs before the plateau stage and the other of the first leg 101a or the second leg 101b being at a regeneration stage that occurs after the plateau stage, the controller 170 is configured to cause increase of the target temperature to an adjusted target temperature. For example, the first leg 101a may be at the plateau stage or at a regeneration stage that occurs after the plateau stage, and the second leg 101b may be at a regeneration stage that occurs before the plateau stage. In such instances, the controller 170 may be configured to increase the temperature from the smaller of the first and the second target temperature (e.g., increase the temperature above the second target temperature described in the example in the previous paragraph) to an adjusted target temperature which is greater than smaller of the first target temperature and the second temperature, for example, greater than the second target temperature, but may also be greater than the first target temperature so as to accelerate heating of the lagging leg (i.e., the one of the legs 101a/b that is behind in terms of regeneration stage) that in the particular scenario described in the previous paragraph is the second leg 101b, towards the plateau stage.

The controller 170 may continue to monitor the regeneration stage of each of the legs 101a/b and determine whether the one of the first leg 101a or the second leg 101b which was at a regeneration stage that occurs before the plateau stage, has reached the plateau stage. Responsive to determining that the one of the first leg 101a or the second leg 101b has reached the plateau stage, the controller 170 is configured to hold or maintain the target temperature at the adjusted target temperature until the plateau stage of the one of the first leg 101a or the second leg 101b that was lagging behind is complete.

In response to each of the first leg 101a and the second leg 101b being at a regeneration stage that occurs after the plateau stage, or an actual temperature of each of the first leg 101a and the second leg 101b being greater than the adjusted target temperature, the controller 170 is configured to set the target temperature to the smaller of the first target temperature of the first leg 101a and the second target temperature of the second leg 101b. In contrast, even after the leg 101a or 101b that was lagging behind in its regeneration stage completes the plateau but the actual temperature of both the legs 101a/b is not greater than the adjusted target temperature, the controller 170 is configured to hold or maintain the target temperature at the adjusted target temperature until the actual temperature (i.e., feedback temperature received from temperature sensors) of both legs 101a/b is greater than the adjusted target temperature. It should be appreciated that the target temperature determined and set by the controller 170 is not a fixed value but changes dynamically over time so as to cause the each of the legs 101a/b of the aftertreatment system 100 to proceed through the various regeneration stages.

In some embodiments, the aftertreatment system 100 includes a first filter outlet temperature sensor 190a. The first filter outlet temperature sensor 190a is disposed at an outlet of the first filter 140a and is configured to measure a feedback temperature at the outlet of the first filter 140a. The first filter outlet temperature sensor 190a is also configured to measure a feedback temperature at the inlet of the first SCR catalyst 150a. In some embodiments, the aftertreatment system 100 includes a second filter outlet temperature sensor 190b. The second filter outlet temperature sensor 190b is disposed at an outlet of the second filter 140b and is configured to measure a feedback temperature at the outlet of the second filter 140b. The second filter outlet temperature sensor 190b is also configured to measure a feedback temperature at the inlet of the second SCR catalyst 150b. The filter outlet temperature sensors 190a/b are operatively coupled to the controller 170. The feedback temperature(s) measured by the filter outlet temperature sensors 190a/b can be used to correct the target temperature (e.g., via a negative offset) if the feedback temperature(s) are too high (e.g., above a threshold).

In some embodiments, the aftertreatment system 100 includes a first SCR catalyst outlet temperature sensor 191a. The first SCR catalyst outlet temperature sensor 191a is disposed at an outlet of the first SCR catalyst 150a and is configured to measure a feedback temperature at the outlet of the first SCR catalyst 150a. The first SCR catalyst outlet temperature sensor 191a is also configured to measure a feedback temperature at the inlet of the first $AMO_X$ catalyst 160a. In some embodiments, the aftertreatment system 100 includes a second SCR catalyst outlet temperature sensor 191b. The second SCR catalyst outlet temperature sensor 191b is disposed at an outlet of the second SCR catalyst 150b and is configured to measure a feedback temperature at the outlet of the second SCR catalyst 150b. The second SCR catalyst outlet temperature sensor 191b is also configured to measure a feedback temperature at the inlet of the second $AMO_X$ catalyst 160b. The SCR catalyst outlet temperature sensors 191a/b are operatively coupled to the controller 170. The feedback temperature(s) measured by the SCR catalyst outlet temperature sensors 191a/b can be used to correct the target temperature (e.g., via a negative offset) if the feedback temperature(s) are too high (e.g., above a threshold).

Figure 7B:
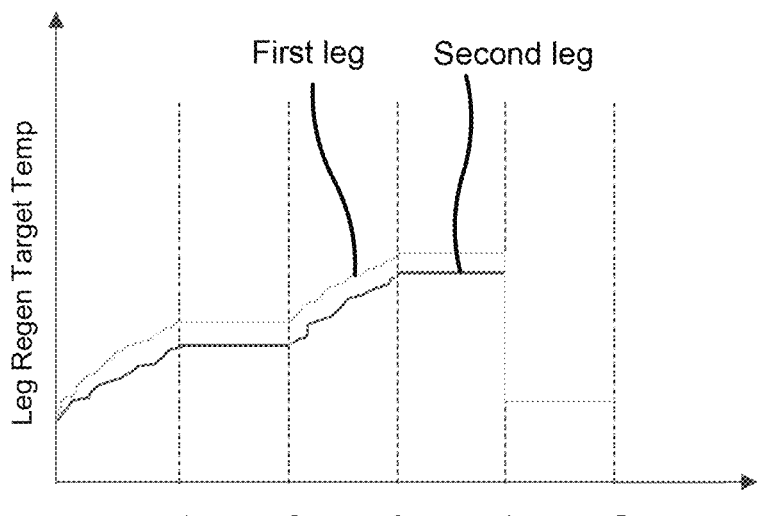
FIG. 7B is a plot of determined target temperatures for each leg of the aftertreatment system of FIG. 1 at different time points during regeneration corresponding to the regeneration stages of FIG. 7A.
Figure 7C:
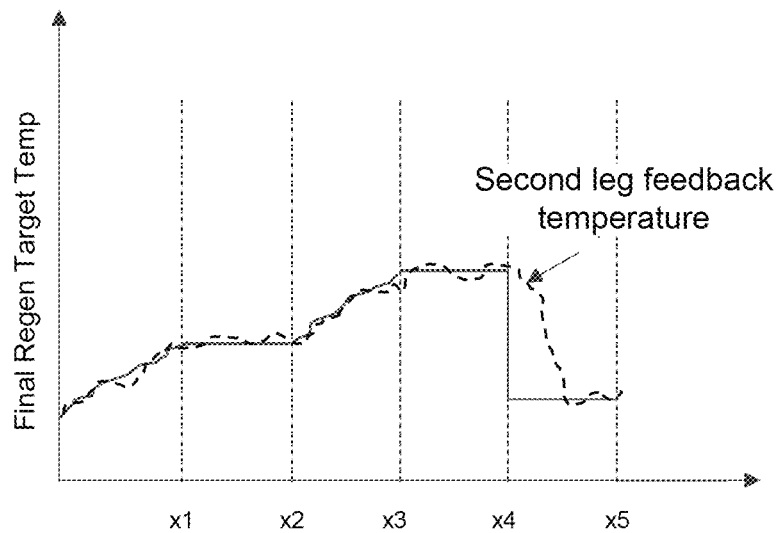
FIG. 7C is a plot of the target temperature set by the controller during the various regeneration stages of each leg corresponding to FIG. 7A.

FIG. 7B, which corresponds to FIG. 7A in which both the first leg 101a and the second leg 101b experience the same regeneration stage at the same time, shows a first target temperature of the first leg 101a, at different time points, that is higher than a target temperature of the second leg 101b, at the same time points. FIG. 7C shows the final target temperature determined by the controller 170 at different time points, which is used to control regeneration of each of the first leg 101a and the second leg 101b, and the corresponding feedback temperature received from the second leg 101b, which corresponds to the measured temperature of the second leg 101b during the various regeneration stages.

Figure 8B:
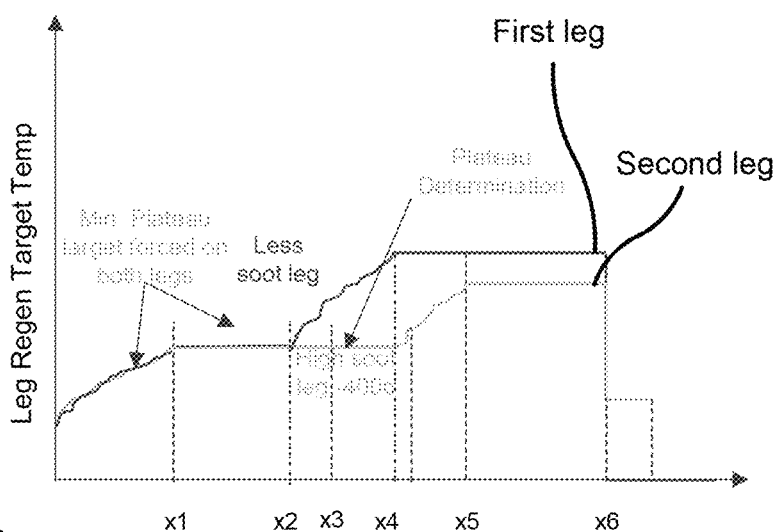
FIG. 8B is a plot of determined target temperatures for each leg of the aftertreatment system of FIG. 1 at different time points during regeneration corresponding to the regeneration stages of FIG. 8A.
Figure 8C:
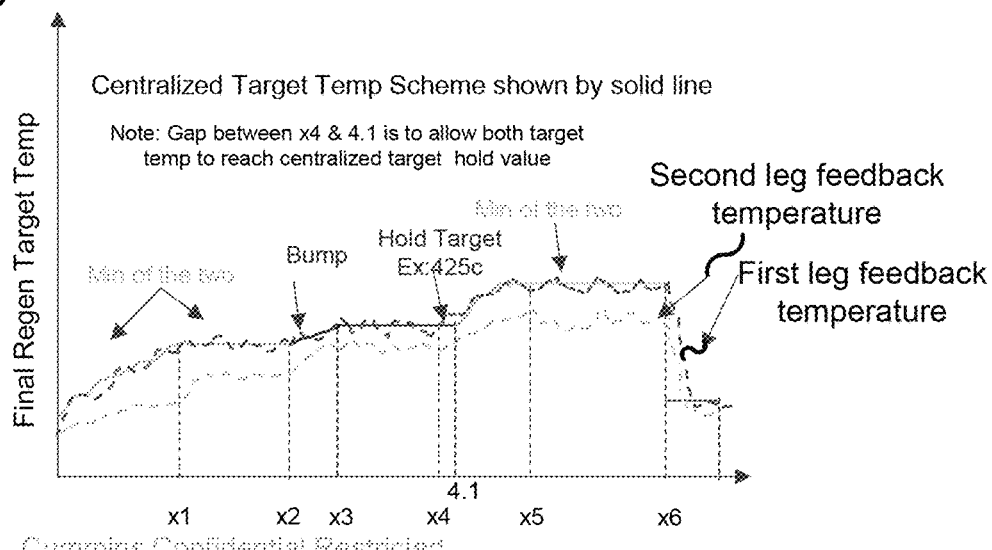
FIG. 8C is a plot of the target temperature set by the controller during the various regeneration stages of each leg corresponding to FIG. 8A.

FIG. 8B, which corresponds to FIG. 8A in which the first leg 101a and the second leg 101b experience different regeneration stages at different times, shows plots of the first target temperature for the first leg 101a and the second target temperature for the second leg 101b at various regeneration stages of each leg 101a/b. FIG. 8C is a plot of final regeneration target temperature set by the controller 170 for controlling regeneration in in each of the two legs 101a/b. Up to time point x2 where the first leg 101a is still in its plateau stage and second leg 101b has not yet started the plateau stage, the target temperature is set by the controller 170 as the smaller (or minimum) of the first and second target temperatures. Once the first leg 101a, which is the leading leg (i.e., experiences various regeneration stages earlier than that second leg 101b) enters the target stage that occurs after the regeneration stage, the controller 170 increases or bumps the target temperature to an adjusted target temperature (e.g., 425 degrees Celsius as shown in FIG. 8C but could be any other adjusted target temperature), and holds the target temperature at the adjusted target temperature until both legs 101a/b exit the target stage, and each of the first leg feedback temperature and the second leg feedback temperature are greater than the adjusted target temperature. The controller 170 then sets the target temperature to be the smaller of the first target temperature and the second target temperature.

While the controller 170 receives feedback temperatures from both legs 101a/b, for example, the oxidation catalyst outlet temperature from the oxidation catalyst outlet temperatures sensors 109a/b, which the controller 170 uses to control or monitor regeneration in each of the legs 101a/b, in some instances the oxidation catalyst outlet temperatures received from the first leg 101a and the second leg 101b may be different. The controller 170 is configured to determine a feedback temperature for controlling regeneration based on each of a first feedback temperature received from the first leg 101a (e.g., a first oxidation catalyst outlet temperature received from the oxidation catalyst outlet temperature sensor 109a), and a second feedback temperature received from the second leg 101b (e.g., a second oxidation catalyst outlet temperature received from the second oxidation catalyst outlet temperature sensor 109b).

For example, the controller 170 may be configured to receive the first feedback temperature signal from the first leg 101a and a second feedback temperature from the second leg 101b to determine the first feedback temperature of the first leg 101a and a second feedback temperature of the second leg 101b, respectively. In response to determining that each of the first leg 101a and the second leg 101b is at a regeneration stage that occurs before their respective target regeneration stages, the controller 170 is configured to use a larger of the first feedback temperature and the second feedback temperature to control an amount of hydrocarbons inserted into the engine 10 to cause increase the temperature of the exhaust gas to the target temperature.

On the other hand, if the controller determines that (i) at least one of the first leg 101a or the second leg 101b is at its target regeneration stage or at a regeneration stage that occurs after the target regeneration stage, and (ii) neither of the first feedback temperature or the second feedback temperature remains above the target temperature for a first time period (e.g., 20-30 seconds), the controller 170 is configured to use an average of the first feedback temperature and the second feedback temperature to control the amount of hydrocarbons inserted into the engine 10 to cause increase of the temperature of the exhaust gas to the target temperature.

In some embodiments, the controller 170 incorporates a temperature control that can cut the first time period short when a temperature of the first leg 101a or the second leg 101b is above a threshold temperature. The amount of hydrocarbons inserted into the engine 10 can be controlled based upon the comparison between the temperature and the threshold temperature. For example, more hydrocarbons can be inserted when the difference between the feedback temperature and the target threshold temperature is greater. Conversely, less hydrocarbons are inserted when the first oxidation catalyst outlet temperature or the second oxidation catalyst outlet temperature is too high above the target temperature.

However, if the controller determines that (i) at least one of the first leg 101a or the second leg 101b is at the target regeneration stage or is at a regeneration stage that occurs after the target regeneration stage, and (ii) one of the first feedback temperature or the second feedback temperature remains above the target temperature for a first time period, the controller 170 is configured to determine and use a weighted average of the first feedback temperature and the second feedback temperature to control the amount of hydrocarbons inserted into the engine 10 to cause increase of the temperature of the exhaust gas to the target temperature.

Figure 9:
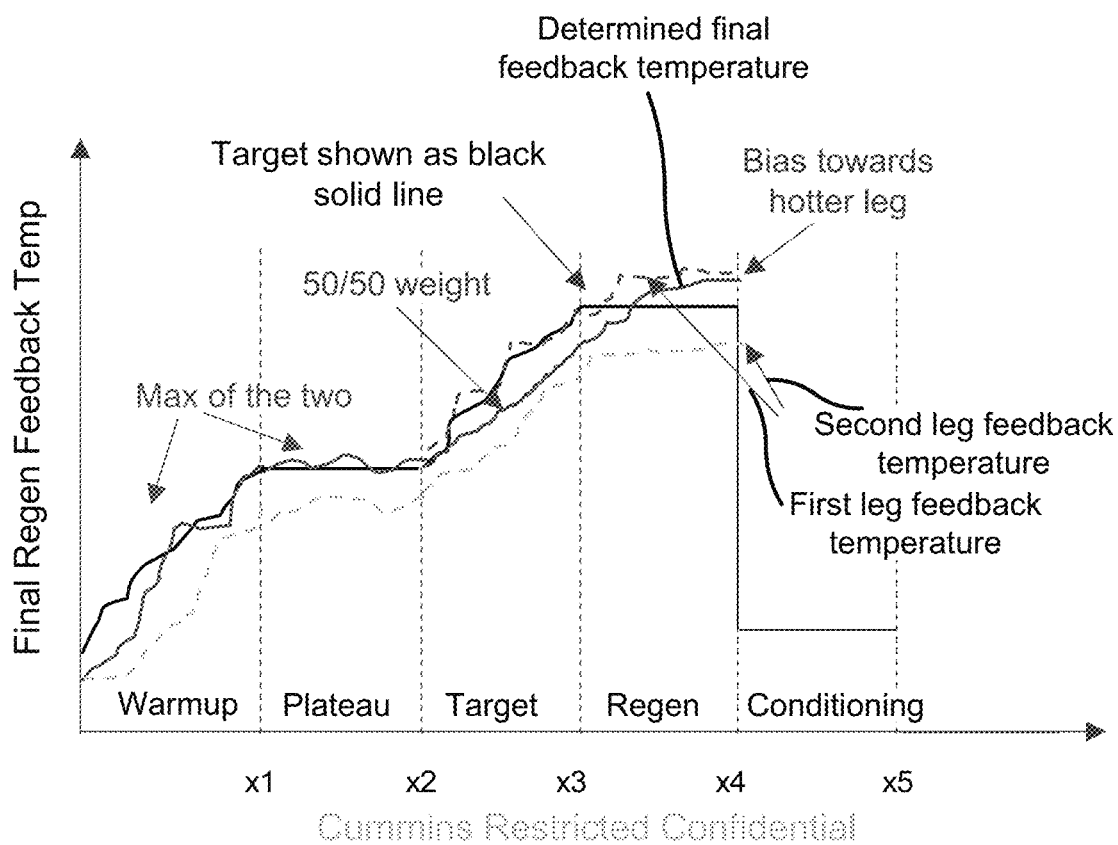
FIG. 9 is a plot of actual feedback temperatures received from the first leg and the second leg of the aftertreatment system of FIG. 1, and a determined feedback temperature that is used to control regeneration of each leg of the aftertreatment temperature.

FIG. 9 shows a plot of final feedback temperature determined by the controller 170 based on first leg feedback temperature and the second leg feedback temperature. Up to time point x2 when both legs are at a regeneration stage that occurs before the target regeneration stage, the greater or maximum of the first leg feedback temperature and the second leg feedback temperature is used by the controller 170 to control regeneration. Once one of the first leg 101a or the second leg 101b is at the target regeneration stage or at a regeneration stage that occurs after the target regeneration stage, the controller 170 uses an average of the first and second leg feedback temperatures (indicated is 50/50 weight in FIG. 9) to control regeneration. Once the controller 170 determines that the first leg feedback temperature remains above the target temperature for a first time period, the controller 170 determines and uses a weighted average of the first and second leg feedback temperatures to control regeneration. For example, in this scenario, the weighted average is biased or weighted towards the first leg feedback temperature because the first leg 101a is hotter than the second leg 101b. Weighting or biasing towards the hotter leg prevents one of the first leg 101a or the second leg 101b to get too hot which can damage the hotter leg.

The controller 170 is configured to determine a hydrocarbon dosing quantity (or feed forward amount of hydrocarbons to be dosed) that should be inserted into the engine 10 achieve the target temperature based on a final oxidation catalyst outlet target temperature that may correspond to the target temperature, the total exhaust gas flow rate, average oxidation catalyst inlet temperatures of the oxidation catalysts 130a/b (e.g., measured by the first sensor 103 or another temperature sensor disposed at an inlet of each of the oxidation catalysts 130a/b), and average of the expected thermal efficiencies of the filters 140a/b. The final oxidation catalyst outlet target temperature may be determined by the controller 170 as previously described herein. While the determined hydrocarbon dosing quantity is based on the target temperature, the actual temperature (i.e., feedback temperature) of each of the legs 101a/b may be different from the target temperature. The controller 170 is configured to also determine an estimated hydrocarbon dosing quantity based on the determined amount of hydrocarbons to be inserted based on the desired target temperature, and the feedback temperature of each leg [e.g., a proportional-integral-derivative (PID) quantity determined using a PID or feedback portion of the controller 170].

Too much hydrocarbon dosing, however, can cause some of the hydrocarbons to slip downstream of the oxidation catalysts 130a/b unburnt which is undesirable. Thus, the first leg 101a has a first hydrocarbon slip limit or first HC slip limit, which corresponds to the maximum amount of hydrocarbons that can be inserted into the first leg 101a without having HC slip based on the feedback temperature of the first leg 101a, and the second leg 101b has a second HC slip limit based on the maximum amount of hydrocarbons that can be inserted into the second leg 101b without having hydrocarbon slip based on feedback temperature of the second leg 101b.

The controller 170 determines whether the exhaust flow rate is greater than a flow threshold. If the exhaust flow rate is less than the flow threshold, the controller 170 continues to monitor the exhaust flow rate. Once the exhaust flow rate is greater than the flow threshold, the controller 170 determines the oxidation catalyst inlet temperature at the inlet of the oxidation catalyst 130a included in the first leg 101a and the oxidation catalyst 130b included in the second leg 101b. If the oxidation catalyst inlet temperature of either one of the oxidation catalysts 130a/b is below its respective light-off temperature that corresponds to a minimum temperature at which the oxidation catalysts 130a/b can catalyze combustion of hydrocarbons, the controller 170 sets the hydrocarbon insertion amount to zero, that is hydrocarbons are not inserted into the engine 10 (other than those being inserted to perform normal engine operation) and regeneration is not initiated.

In response to the oxidation catalyst inlet temperature of each of the first leg 101a and the second leg 101b of the aftertreatment system 100 being greater than their respective light-off temperatures, the controller 170 determines whether an estimated hydrocarbon dosing quantity of the hydrocarbons to be inserted into the engine 10 is less than a first leg hydrocarbon slip limit of the first leg and a second leg hydrocarbon slip limit of the second leg. In response to the estimated hydrocarbon dosing quantity being less than each of the first leg hydrocarbon slip limit and the second leg hydrocarbon slip limit, the controller 170 sets the hydrocarbon dosing quantity of hydrocarbons to be dosed into the engine 10 as the estimated hydrocarbon dosing quantity.

On the other hand, in response to determining that the estimated hydrocarbon dosing quantity is greater than each of the first leg hydrocarbon slip limit and the second leg hydrocarbon slip limit, the controller 170 determines whether the first leg hydrocarbon slip limit is greater than the second hydrocarbon slip limit. In response to the first leg hydrocarbon slip limit being greater than the second leg hydrocarbon slip limit, the controller 170 sets the second leg hydrocarbon slip limit as the hydrocarbon dosing quantity, and in response to the first leg hydrocarbon slip limit being less than the second leg hydrocarbon slip limit, the controller 170 sets the first leg hydrocarbon slip limit as the hydrocarbon dosing quantity. Thus, the controller 170 always selects the smaller of the first hydrocarbon slip limit and the second hydrocarbon slip limit as the dosing quantity to prevent hydrocarbon slip limit in both legs 101a/b.

Figure 10:
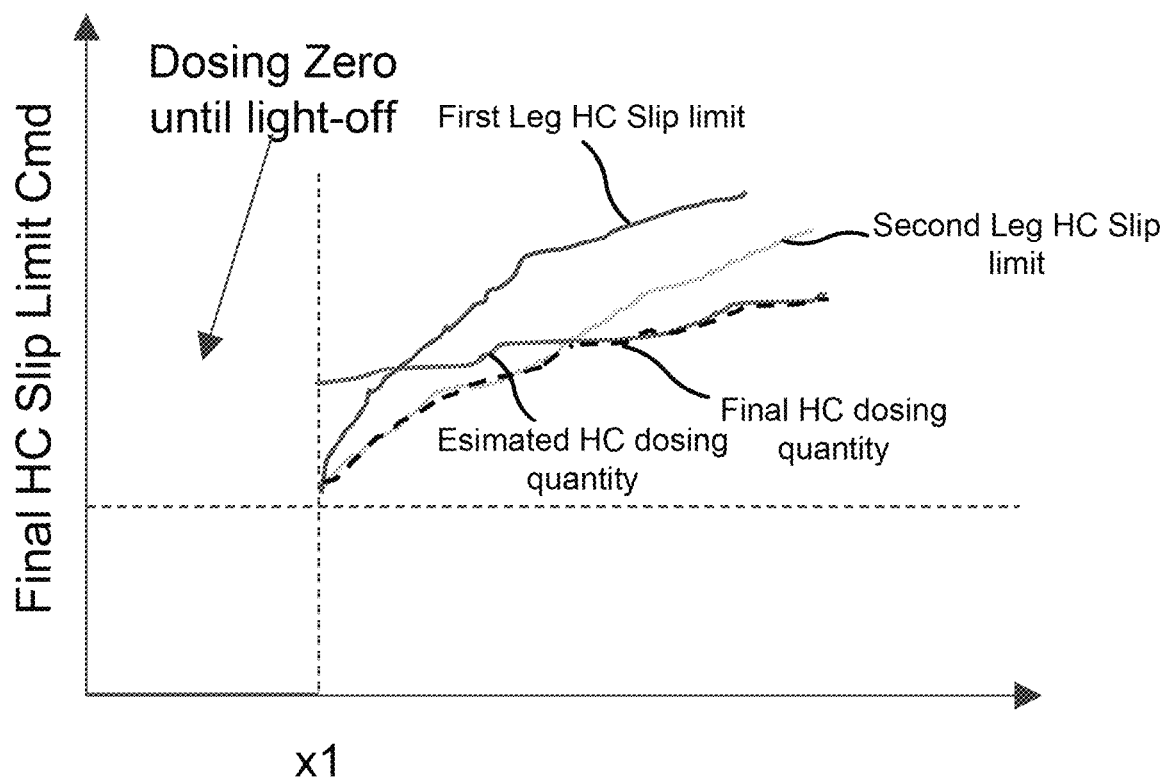
FIG. 10 is a plot of hydrocarbon (HC) slip limits of the first leg and the second leg of the aftertreatment system, an estimated HC dosing quantity to achieve regeneration, and final HC dosing quantity of HCs inserted into the engine to cause regeneration in each leg of the aftertreatment system, according to an embodiment.

FIG. 10 is a plot of first leg hydrocarbon slip limit of the first leg 101a, and the second leg hydrocarbon slip limit of the second leg 101b, the estimated hydrocarbon dosing quantity, and the final estimated dosing quantity of hydrocarbons that are inserted into the engine 10. The controller 170 does not initiate hydrocarbon dosing until time point x1 until the oxidation catalysts 130a/b reach their respective light-off temperatures. The controller 170 then controls the HC dosing quantity such that the final HC dosing quantity always remains below the first leg HC slip limit and the second leg HC slip limit.

Figure 11:
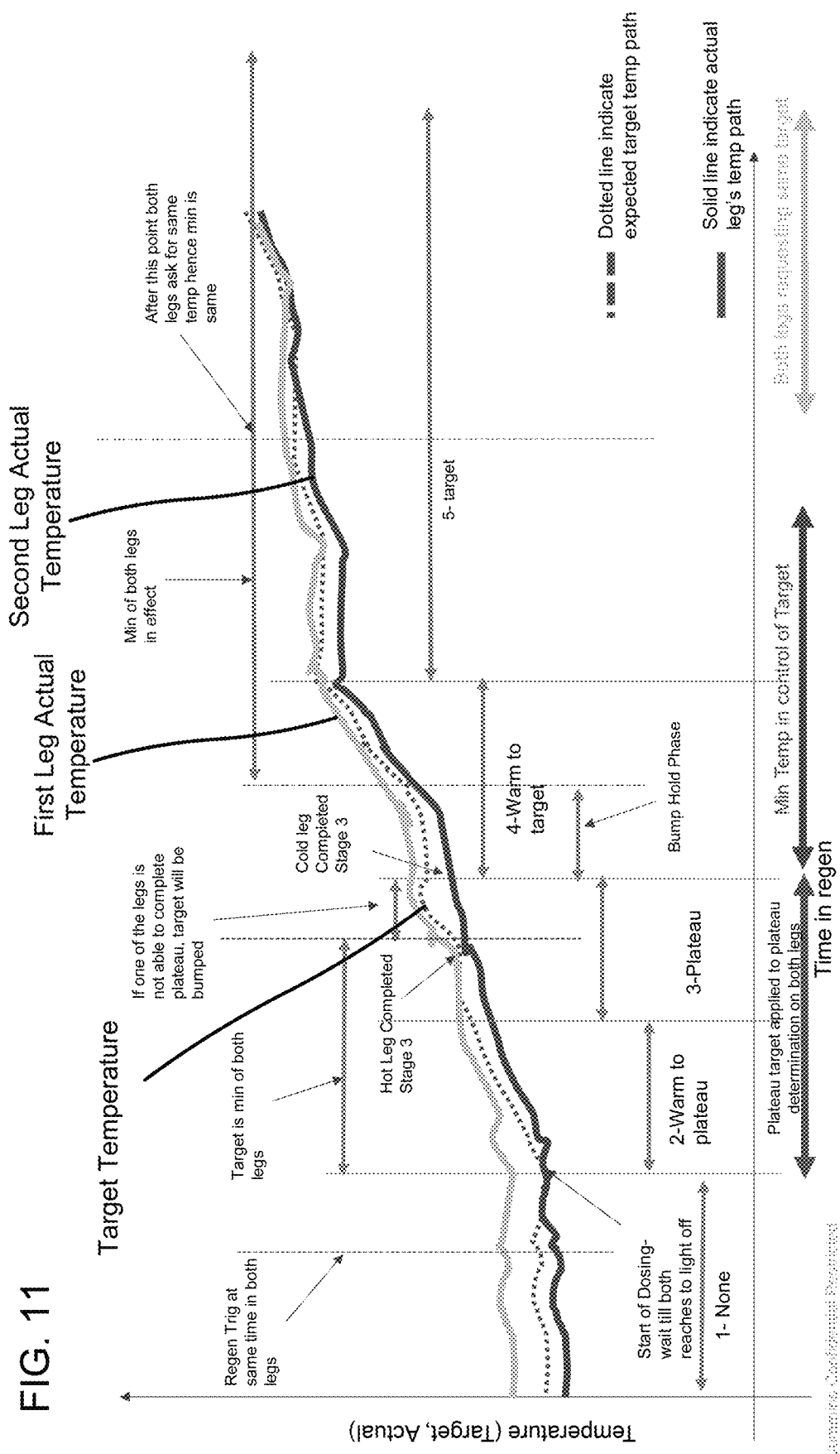
FIG. 11 is a plot of actual temperature of the first and second legs of the aftertreatment system, and the set target temperature for each leg during a regeneration cycle of the aftertreatment system of FIG. 1.

FIG. 11 is a plot of target temperature and actual or feedback temperature received from each of the first leg 101a and the second leg 101b as each of the legs proceed through their respective regeneration stages, as the aftertreatment system 100 proceeds through regeneration controlled by the controller 170. As seen in FIG. 11, the controller 170 initiates regeneration in each of the legs 101a/b simultaneously, and dynamically adjusts the target temperature such that even though regeneration may be initially out of sync between the two legs 101a/b, the two legs 101a/b converge towards requesting the same target temperature.

The controller 170 receives temperatures from various temperature sensors. In some instances, one or more of the temperature sensors may malfunction. In such instances the controller 170 uses temperature signals received from other temperature sensors in lieu of the failed temperature sensor, or use a default temperature value instead. For example, if an oxidation catalyst inlet temperature sensor fails, the controller 170 may use an oxidation catalyst outlet temperature measured by an oxidation catalyst outlet temperature sensor (e.g., the sensor 109a/b) if the oxidation catalyst outlet temperature sensor is working properly. In some embodiments, the controller 170 may be configured to adjust the oxidation catalyst outlet temperature based on ambient temperature, and may only adjust the oxidation catalyst outlet temperature when hydrocarbons are not being inserted into the oxidation catalyst 130a/b. However, if the oxidation catalyst outlet temperature sensor also has errors, the controller 170 may use a default oxidation catalyst inlet temperature value stored in a memory of the controller 170 instead.

If an oxidation catalyst outlet temperature sensor fails but an oxidation catalyst inlet temperature sensor (e.g., the first sensor 103) is working properly, the controller 170 may use an oxidation catalyst inlet temperature measured by the oxidation catalyst inlet temperature sensor, or a filter outlet temperature at an outlet of the filter 140a/b, which may be adjusted based on ambient temperature if the filter outlet temperature is working properly. However, if the oxidation catalyst inlet temperature sensor and the filter outlet temperature sensor have errors, the controller 170 may use a default oxidation catalyst outlet temperature value stored in a memory of the controller 170 instead.

If a filter outlet temperature sensor fails but an oxidation catalyst outlet temperature sensor (e.g., the sensor 109a/b) is working properly, the controller 170 may use an oxidation catalyst outlet temperature measured by the oxidation catalyst outlet temperature sensor. However, if the oxidation catalyst outlet temperature sensor also has errors, the controller 170 may use a default filter outlet temperature value stored in a memory of the controller 170 instead.

Generally, the controller 170 may be configured to determine an SCR inlet temperature at an inlet of the SCR catalysts 150a/b based on a weighted average between a filter outlet temperature measured by a filter outlet temperature sensor, and a SCR inlet temperature measured by a SCR inlet temperature sensor. If the filter outlet temperature sensor fails, the controller 170 may use the SCR inlet temperature alone without calculating the weighted average.

If an SCR outlet temperature sensor fails, the controller 170 may be configured to use a default SCR outlet temperature value in lieu of the measured SCR outlet temperature.

Figure 2:
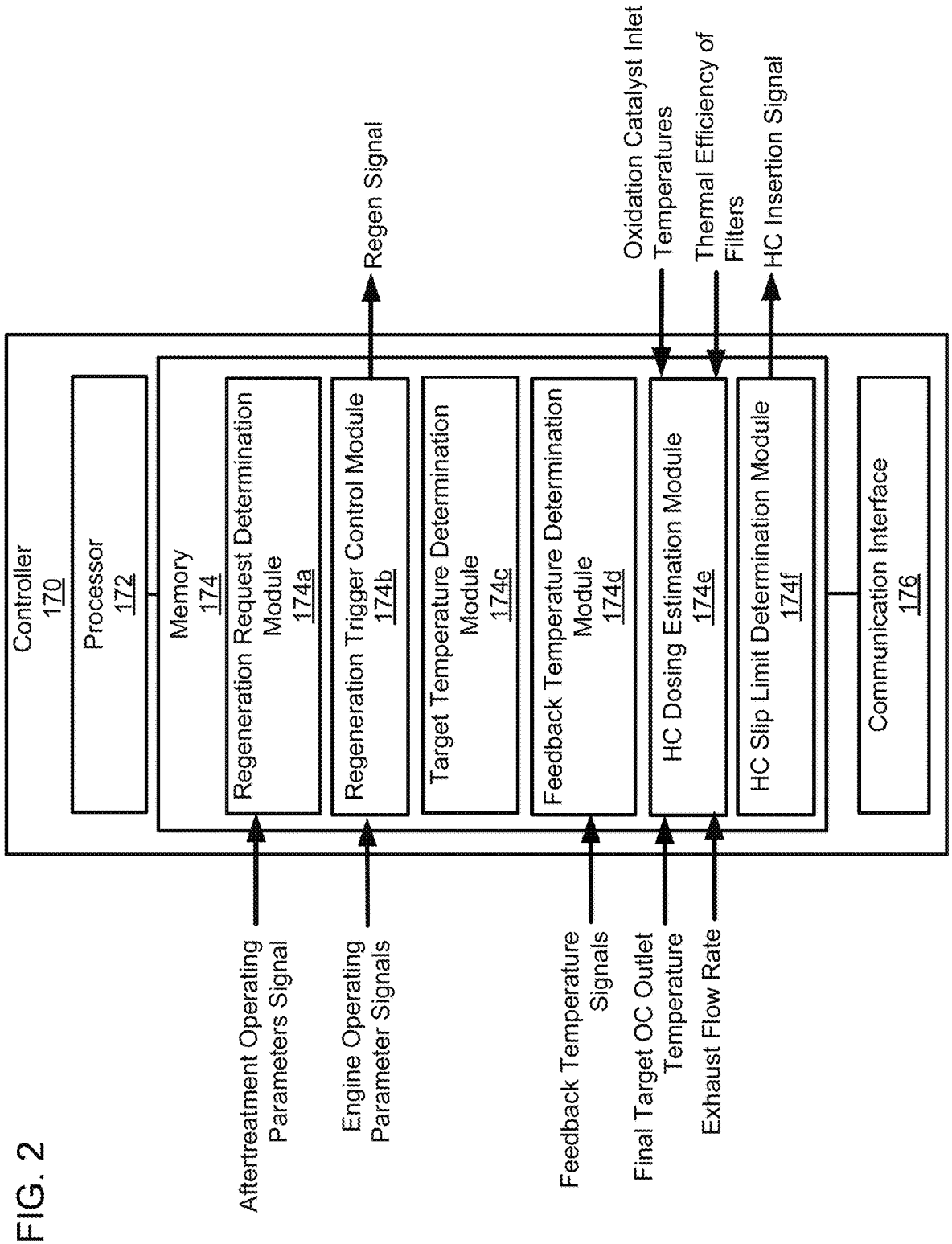
FIG. 2 is a block diagram of a controller that may be included in the aftertreatment system of FIG. 1, according to an embodiment.

In some embodiments, the controller 170 includes various circuitries or modules configured to perform the operations of the controller 170 described herein. For example, FIG. 2 shows a block diagram of the controller 170, according to an embodiment. The controller 170 may include a processor 172, a memory 174, or any other computer readable medium, and a communication interface 176. Furthermore, the controller 170 includes a regeneration request determination module 174a, a regeneration trigger control module 174b, a target temperature determination module 174c, a feedback temperature determination module 174d, a HC dosing estimation module 174e, and a HC slip limit determination module 174f. It should be understood that FIG. 2 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions, for example, for controlling regeneration.

In one configuration, the regeneration request determination module 174a, the regeneration trigger control module 174b, the target temperature determination module 174c, the feedback temperature determination module 174d, the HC dosing estimation module 174e, and the HC slip limit determination module 174f are embodied as machine or computer-readable media (e.g., stored in the memory 174) that is executable by a processor, such as the processor 172. As described herein and amongst other uses, the machine-readable media (e.g., the memory 174) facilitates performance of certain operations of the regeneration request determination module 174a, the regeneration trigger control module 174b, the target temperature determination module 174c, the feedback temperature determination module 174d, the HC dosing estimation module 174e, and the HC slip limit determination module 174f to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the regeneration request determination module 174a, the regeneration trigger control module 174b, the target temperature determination module 174c, the feedback temperature determination module 174d, the HC dosing estimation module 174e, and the HC slip limit determination module 174f are embodied as hardware units, such as electronic control units. As such, the regeneration request determination module 174a, the regeneration trigger control module 174b, the target temperature determination module 174c, the feedback temperature determination module 174d, the HC dosing estimation module 174e, and the HC slip limit determination module 174f may be embodied as one or more circuitry components including, but not limited to, processing circuitry, network interfaces, peripheral devices, input devices, output devices, sensors, etc.

In some embodiments, the regeneration request determination module 174a, the regeneration trigger control module 174b, the target temperature determination module 174c, the feedback temperature determination module 174d, the HC dosing estimation module 174e, and the HC slip limit determination module 174f may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the regeneration request determination module 174a, the regeneration trigger control module 174b, the target temperature determination module 174c, the feedback temperature determination module 174d, the HC dosing estimation module 174e, and the HC slip limit determination module 174f may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the regeneration request determination module 174a, the regeneration trigger control module 174b, the target temperature determination module 174c, the feedback temperature determination module 174d, the HC dosing estimation module 174e, and the HC slip limit determination module 174f may also include programmable hardware devices such as field programmable gate arrays, programmable array logic, programmable logic devices or the like. In this regard, the regeneration request determination module 174a, the regeneration trigger control module 174b, the target temperature determination module 174c, the feedback temperature determination module 174d, the HC dosing estimation module 174e, and the HC slip limit determination module 174f may include one or more memory devices for storing instructions that are executable by the processor(s) of the regeneration request determination module 174a, the regeneration trigger control module 174b, the target temperature determination module 174c, the feedback temperature determination module 174d, the HC dosing estimation module 174e, and the HC slip limit determination module 174f. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the regeneration request determination module 174a, the regeneration trigger control module 174b, the target temperature determination module 174c, the feedback temperature determination module 174d, the HC dosing estimation module 174e, and the HC slip limit determination module 174f Thus, the depicted configuration represents the aforementioned arrangement in which the regeneration request determination module 174a, the regeneration trigger control module 174b, the target temperature determination module 174c, the feedback temperature determination module 174d, the HC dosing estimation module 174e, and the HC slip limit determination module 174f are embodied as machine or computer-readable media. However, as mentioned above, this illustration is not meant to be limiting as the present disclosure contemplates other embodiments such as the aforementioned embodiment where the regeneration request determination module 174a, the regeneration trigger control module 174b, the target temperature determination module 174c, the feedback temperature determination module 174d, the HC dosing estimation module 174e, and the HC slip limit determination module 174f, or at least one circuit of the regeneration request determination module 174a, the regeneration trigger control module 174b, the target temperature determination module 174c, the feedback temperature determination module 174d, the HC dosing estimation module 174e, and the HC slip limit determination module 174f are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the regeneration request determination module 174a, the regeneration trigger control module 174b, the target temperature determination module 174c, the feedback temperature determination module 174d, the HC dosing estimation module 174e, and the HC slip limit determination module 174f) may comprise or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the first sensor 103, the second sensors 105a/b, the pressure sensors 107a/b, the oxidation catalyst outlet temperature sensors 109a/b, the reductant insertion assembly 120, the hydrocarbon insertion assembly, or the engine controller 20. The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The regeneration request determination module 174a is configured to receive aftertreatment operating parameter signals from the sensors (e.g., the first sensor 103, the second sensors 105a/b, the pressure sensors 107a/b, the oxidation catalyst outlet temperature sensors 109a/b, or any other sensors) coupled to each of the first leg 101a and the second leg 101b to determine whether either of the first leg 101a or the second leg 101b requires regeneration (i.e., whether one of the filters 140a or 140b is clogged that creates a demand for filter 140a and/or 140b regeneration, or the catalytic conversion efficiency of the SCR catalyst 150a or 150b has dropped below a threshold creating a demand for SCR catalyst 150a and/or 150b regeneration).

The regeneration trigger control module 174b is configured to receive engine operating parameters signals from the engine controller 20 and determines whether regeneration is permitted by the engine 10. If regeneration is permitted by the engine 10, the controller 170 determines if any one of the first leg 101a or the second leg 101b is inhibiting regeneration based on the aftertreatment operating parameter signals, as previously described. If none of the legs 101a/b is inhibiting regeneration, the engine controller 20 permits regeneration, and at least one of the legs 101a or 101b is requesting regeneration, the regeneration trigger control module 174b generates a regen signal to initiate regeneration in both the legs 101a/b as previously described.

The target temperature determination module 174c is configured to determine a target temperature and dynamically adjust the target temperature based on the target temperature determined for each of the first leg 101a and the second leg 101b, and the regeneration stage of each leg at various time points, as previously described herein.

The feedback temperature determination module 174d is configured to receive feedback temperature signals from each of the first leg 101a and the second leg 101b, and determine the feedback temperature to determine the target temperatures and control regeneration, as previously described.

The HC dosing estimation module 174e is configured to determine an estimated HC dosing quantity based on the final target oxidation catalyst outlet temperatures of the oxidation catalysts 130a/b, the exhaust flow rate of the exhaust gas emitted by the engine 10, the average of the oxidation catalyst inlet temperatures of the oxidation catalysts 130a/b, and an average thermal efficiency of the filters 140a/b, as well as the actual or feedback temperatures, as previously described.

The HC slip limit determination module 174f is configured to determine the HC slip limits of each of the first leg 101a and the second leg 101b, and generate a HC insertion signal to insert a quantity of hydrocarbons into the engine 10 to cause regeneration based on the HC slip limits of each of the legs 101a/b, and the estimated HC dosing quantity, as previously described.

Figure 3:
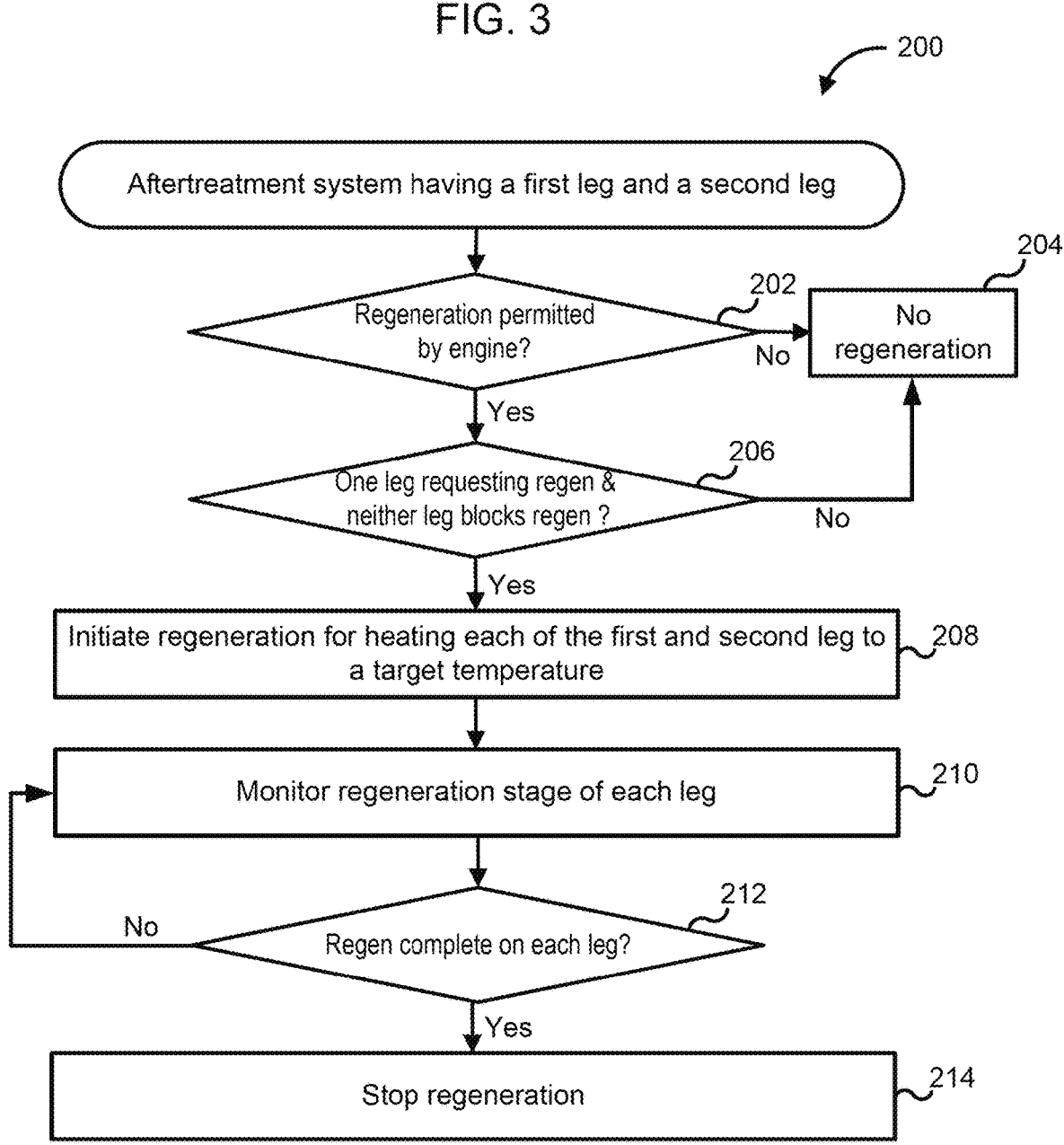
FIG. 3 is a schematic flow diagram of a method for initiating regeneration in an aftertreatment system that includes a first leg and a second leg, according to an embodiment.

FIG. 3 is a flow charts showing a method 200 for initiating regeneration in an aftertreatment system (e.g., the aftertreatment system 100) that includes a first leg (e.g., the first leg 101a) and a second leg (e.g., the second leg 101b), according to an embodiment. While described with reference to the controller 170, the engine 10 and the aftertreatment system 100, the operations of the method 200 can be used with any controller that is operatively coupled to any aftertreatment system that includes multiple legs, and that is coupled to any engine.

The method 200 includes determining by the controller 170 whether regeneration is permitted by the engine 10 based on a signal received from the engine controller 20, at 202. If the controller 170 determines that the engine 10 does not permit regeneration (202: NO), the method 200 proceeds to operation 204 and the controller 170 does not trigger or initiate regeneration. The method 200 then returns to operation 202.

If the controller 170 determines that engine 10 permits regeneration (202: YES), the controller 170 determines whether regeneration is requires by at least one of the first leg 101a or the second leg 101b based on operating parameters of the first leg 101a and the second leg 101b, and whether regeneration is inhibited in either the first leg 101a or the second leg 101b, at 206. If the controller 170 determines neither of the legs 101a/b requires regeneration, or if at least one of the legs 101a or 101b requires regeneration, but one of the legs 101a/b is inhibiting regeneration (206: NO), the method 200 proceeds to operation 204, and the controller 170 does not initiate regeneration.

On the other hand, if at 208, the controller 170 determines that at least one of the legs 101a/b requires regeneration and regeneration is not inhibited in either the first leg 101a or the second leg 101b (206: YES), the controller 170 initiates regeneration at 208, by causing insertion of hydrocarbons (e.g., via the hydrocarbon insertion assembly 122) into the engine 10 to increase the temperature of the exhaust gas to cause regeneration in each of the first leg 101a and the second leg 101b.

At 208, the controller 170 continues to monitor a regeneration stage of each of the first leg 101a and the second leg 101b. At 212, the controller 170 determines if regeneration is complete in each of the first leg 101a and the second leg 101b. If the controller 170 determines that regeneration is not complete in at least one of the first leg 101a or the second leg 101b (212: NO), the method 200 returns to operation 210, and the controller 170 continues to monitor the regeneration stage of each of the legs 101a/b. On the other hand, once the controller 170 determines that regeneration is complete in each of the first leg 101a and the second leg 101b, the controller 170 stops regeneration, at 214.

Figure 4:
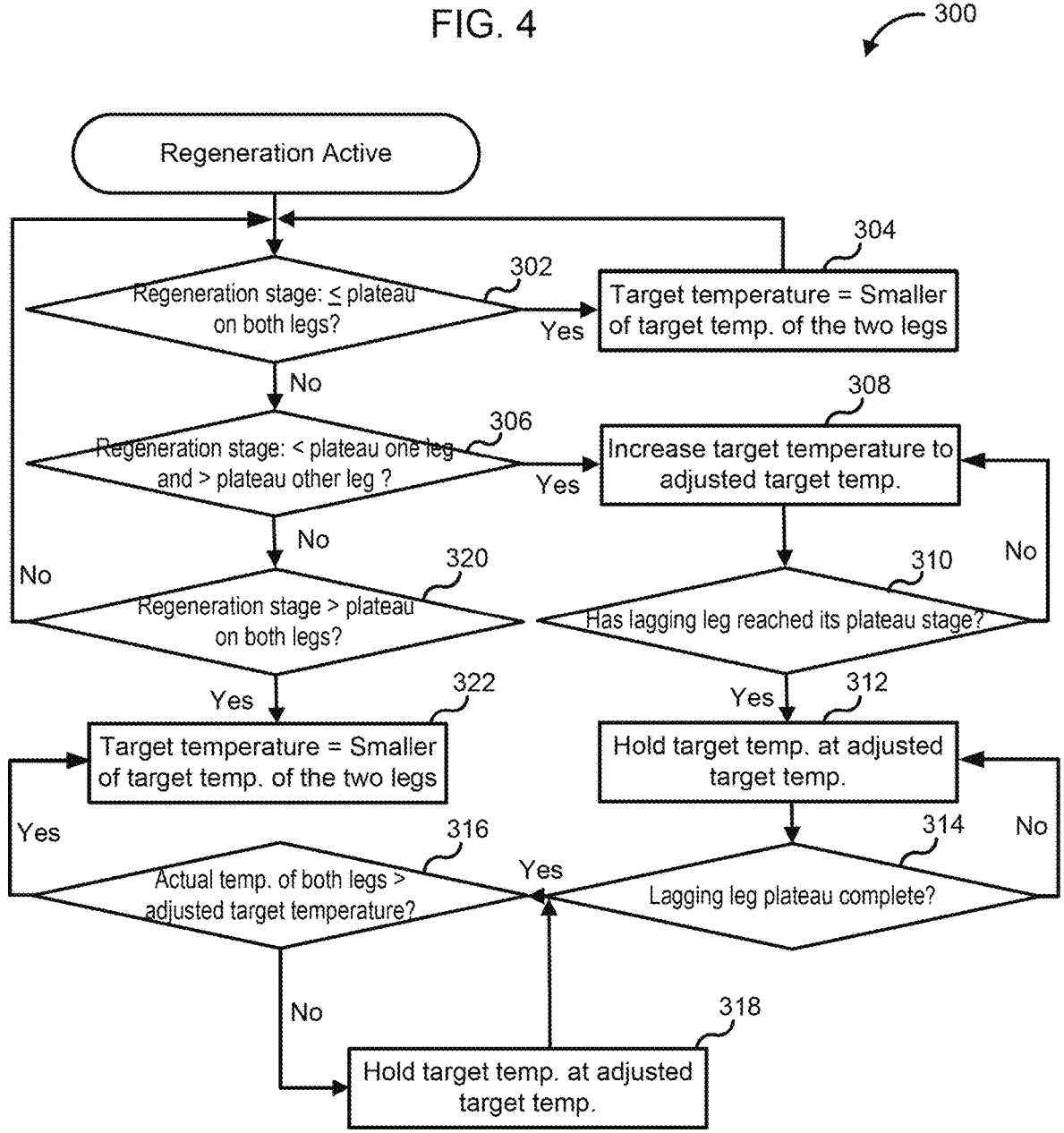
FIG. 4 is a schematic flow diagram of a method for determining and setting a target temperature to which the legs are heated in the method of FIG. 3, according to an embodiment.

FIG. 4 is a schematic flow diagram of a method 300 for determining and setting a target temperature to which the legs 101a/b are heated in the method of FIG. 3, according to an embodiment. The method 300 starts after regeneration is active, triggered or initiated by the controller 170. At 302, the controller 170 determines whether each of the first leg 101a and the second leg 101b is at a regeneration stage that occurs before the plateau stage. If the controller 170 determines that each of the legs 101a/b is at a regeneration stage that occurs before below the plateau stage, i.e., have not yet reached the plateau stage, (302: YES), the controller 170 sets the target temperature as the smaller of a first target temperature of the first leg 101a and a second target temperature of the second leg 101b.

If the controller determines that both legs 101a/b are not at a regeneration stage that occurs before the plateau stage (302: NO), the controller 170 determines whether one of the first leg 101a or the second leg 101b is at a regeneration stage that occurs before the plateau stage, and the other of the first leg 101a or the second leg 101b is at a regeneration stage that occurs after the plateau stage, at 306. In response to the one of the first leg 101a or the second leg 101b being at a regeneration stage that occurs before the plateau stage, and the other of the first leg 101a or the second leg 101b being at a regeneration stage that occurs after the plateau stage (306: YES), the method proceeds to operation 308 and the controller 170 causes increase of the target temperature to an adjusted target temperature that is greater than the smaller of a first target temperature of the first leg 101a and a second target temperature of the second leg 101b.

At 310, the controller 170 determines whether the lagging leg, i.e., the one of the first leg 101a or the second leg 101b which was at a regeneration stage that occurs before plateau stage, has reached its plateau stage. If the controller 170 determines that the lagging leg has not reached its plateau stage (310: NO), the method returns to operation 308 and the controller 170 continues to increase the target temperature to the adjusted target temperature (e.g., continue to increase the adjusted target temperature). Responsive to determining that the one of the first leg 101a or the second leg 101b has reached its plateau stage (310: YES), the controller 170 causes maintaining of the target temperature at the adjusted target temperature, at 312.

At 314, the controller 170 determines whether the lagging leg of the legs 101a/b has completed its plateau stage. If the controller 170 determines that the lagging leg of the legs 101a/b has not completed its plateau stage (314: NO), the method returns to operation 312, and the controller 170 continues to maintain or hold the target temperature at the adjusted target temperature. If the controller 170 determines that lagging leg of the legs 101a/b has completed its plateau stage (314: YES), the controller 170 determines if an actual or feedback temperature of both the legs 101a/b is greater than the adjusted target temperature, at 316. If the controller 170 determines that the actual temperature of at least one the first leg 101a and the second leg 101b is less than the adjusted target temperature (316: NO), the controller 170 continues to hold the target temperature at the adjusted target temperature, at 318.

In response to determining that actual temperature of both of the legs 101a/b is greater than the adjusted target temperature (316: YES), the controller 170 sets the target temperature as the smaller of the first target temperature of the first leg 101a and the second target temperature of the second leg 101b, at 322.

If at operation 306, the controller 170 determines that the regeneration stage in neither of the legs 101a/b is less than the plateau stage (306: NO), the controller determines whether the regeneration stage is greater than the plateau stage on both legs 101a/b, at 320. If the controller 170 determines that the regeneration stage is not greater than the plateau stage on both legs (320: NO), the method 300 returns to operation 302. On the other hand, in response to the regeneration stage of each of the first leg 101a and the second leg 101b being greater than the plateau stage (320: YES), the method 300 proceeds to operation 322, and the controller 170 sets the target temperature to the smaller of the first target temperature and the second target temperature.

Figure 5:
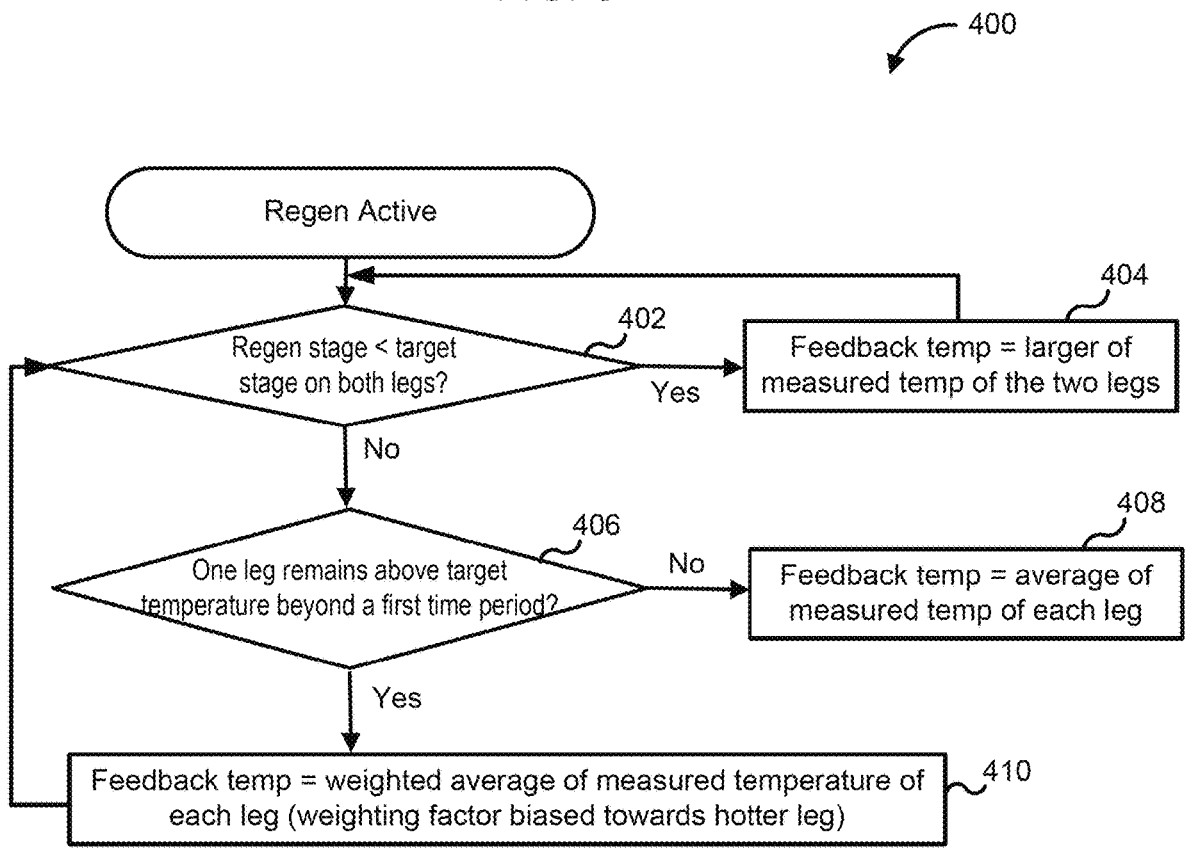
FIG. 5 is a schematic flow diagram of a method for determining the feedback temperature that may be used for controlling regeneration performed via the method of FIG. 3, according to an embodiment.

FIG. 5 is a schematic flow diagram of a method 400 for determining the feedback temperature that may be used for controlling regeneration performed via the method 200, according to an embodiment. The method 400 starts after regeneration is active, triggered or initiated by the controller 170. The method 400 includes determining whether both the first leg 101a and the second leg 101b is at a regeneration stage that occurs before the target stage, at 402. For example, the controller 170 may receive a first feedback temperature signal from the first leg 101a and a second feedback temperature from the second leg 101b to determine a first feedback temperature of the first leg 101a and a second feedback temperature of the second leg 101b, respectively. The controller 170 may determine the regeneration stage of the first leg 101a based on the first feedback temperature and the regeneration stage of the second leg 101b based on the second feedback temperature.

In response to determining, by the controller 170, that each of the first leg 101a and the second leg 101b is 1 at a regeneration stage that occurs before a target regeneration stage of each of the first leg 101a and the second leg (402: YES), the controller 170 uses a larger of the first feedback temperature and the second feedback temperature to control an amount of hydrocarbons inserted into the engine 10 to cause increase of the temperature of the exhaust gas to the target temperature, at 404.

If the controller 170 determines that at least one of the first leg 101a or the second leg 101b is at the target regeneration stage or at a regeneration stage that occurs after the target regeneration stage (402: NO), the controller 170 determines whether at least one of the first leg 101a or the second leg 101b remains above the target temperature beyond a first time period, at 406. If at 406, the controller 170 determines that neither of the first feedback temperature or the second feedback temperature remains above the target temperature for the first time period (406: NO), the controller 170 uses an average of the first feedback temperature and the second feedback temperature to control the amount of hydrocarbons inserted into the engine 10 to cause increase of the temperature of the exhaust gas to the target temperature, at 408. On the other hand, in response to determining, by the controller 170, that one of the first feedback temperature or the second feedback temperature remains above the target temperature for the first time period, the controller 170 uses a weighted average of the first feedback temperature and the second feedback temperature to control the amount of hydrocarbons inserted into the engine 10 to cause increase of the temperature of the exhaust gas to the target temperature, at 410. The weighted average may be biased towards the one of the first leg 101a or the second leg 101b that has the higher feedback temperature. The method 400 then returns to operation 402.

Figure 6:
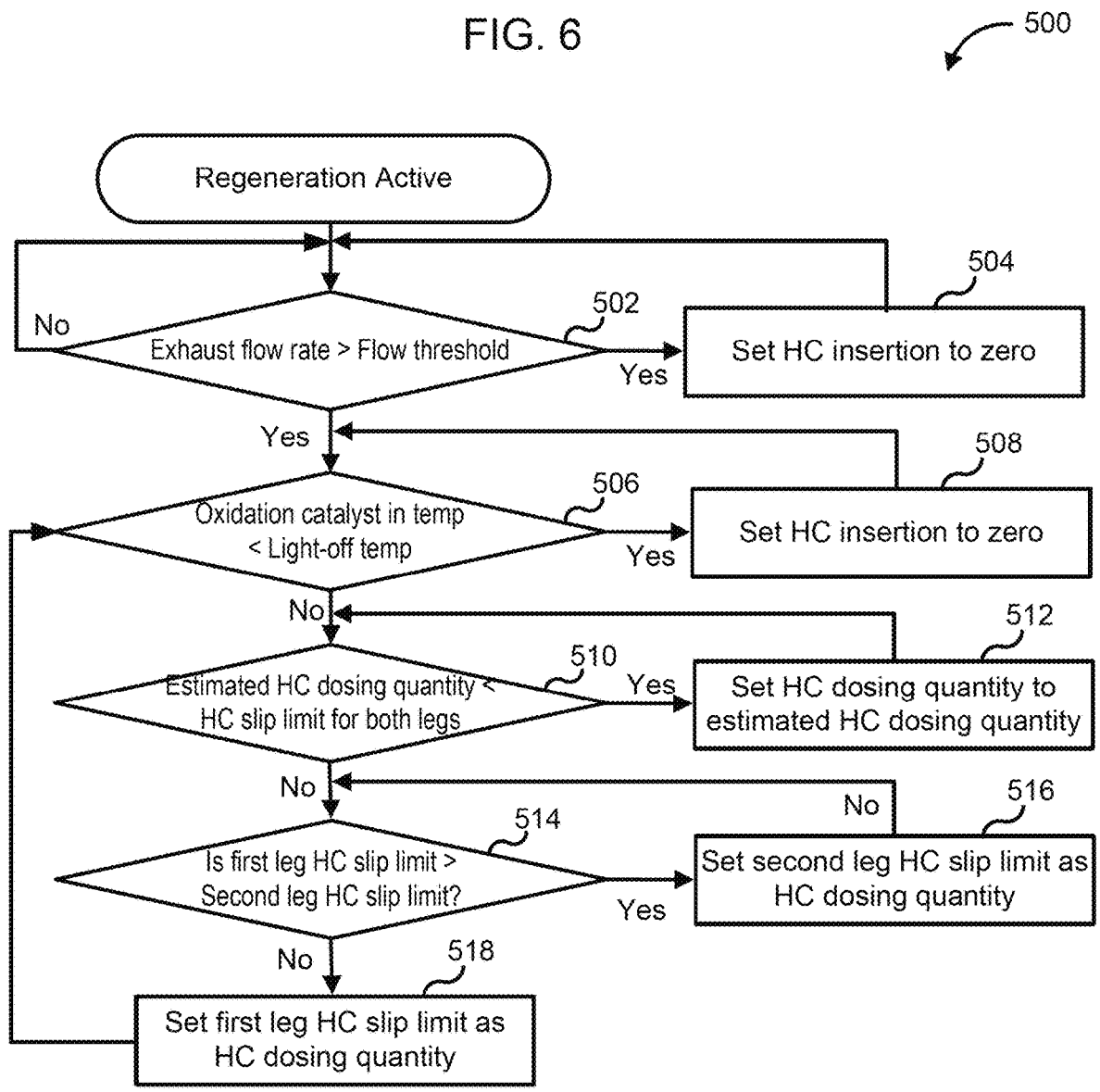
FIG. 6 is a schematic flow diagram of a method for setting a hydrocarbon dosing quantity to prevent hydrocarbons from slipping through each leg of the aftertreatment system during regeneration performed via the method of FIG. 3, according to an embodiment.

FIG. 6 is a schematic flow diagram of a method 500 for setting a hydrocarbon dosing quantity to prevent hydrocarbons from slipping through each of the first leg 101a and the second leg 101b of the aftertreatment system 100 during regeneration performed by the controller 170 via the method 200, according to an embodiment. The method 500 starts when regeneration is active and includes determining whether an exhaust flow rate of the exhaust gas emitted by the engine 10 is greater than a flow threshold, at 502. If the exhaust flow rate is less than the flow threshold (502: NO), the controller 170 sets hydrocarbon insertion to zero, at 504, i.e., hydrocarbons are not inserted into the engine 10. The method 500 then returns to operation 502 and the controller 170 continues to monitor the exhaust flow rate.

In response to determining that exhaust flow rate is greater that the flow threshold (502: YES), the controller 170 determines an oxidation catalyst inlet temperature at an inlet of an oxidation catalyst 130a/b included in each of the first leg 101a and the second leg 101b of the aftertreatment system 100, and whether the oxidation catalyst inlet temperature is less than a light-off temperature of the oxidation catalysts 130a/b, at 506. If the controller 170 determines that the oxidation catalyst inlet temperature of at least one of the oxidation catalysts 130a/b is less than its respective light-off temperature (506: YES), the controller 170 sets hydrocarbon insertion to zero, at 508, i.e., hydrocarbons are not inserted into the engine 10. The method 500 then returns to operation 506 and the controller 170 continues to monitor the oxidation catalyst inlet temperatures of each of the oxidation catalysts 130a/b.

In response to the oxidation catalyst inlet temperature of each of the first leg 101a and the second leg 101b of the aftertreatment system 100 being greater than the respective light-off temperatures thereof (506: NO), the controller 170 determines whether an estimated hydrocarbon dosing quantity determined by the controller 170 of the hydrocarbons to be inserted into the engine 10 is less than a first leg hydrocarbon slip limit of the first leg 101a and a second leg hydrocarbon slip limit of the second leg 101b, at 510. In response to the estimated hydrocarbon dosing quantity being less than each of the first leg hydrocarbon slip limit and the second leg hydrocarbon slip limit (510: YES), the controller 170 sets the hydrocarbon dosing quantity of hydrocarbons to be dosed into the engine 10 as the estimated hydrocarbon dosing quantity, at 512.

On the other hand, if the estimated hydrocarbon dosing quantity is greater than the hydrocarbon slip limit for both legs 101a/b at 510 (510: NO), the controller 170 determines if the first leg hydrocarbon slip limit is greater than the second leg hydrocarbon slip limit, at 514. In response to the first leg hydrocarbon slip limit being greater than the second leg hydrocarbon slip limit (514: YES), the controller 170 sets the second leg hydrocarbon slip limit as the hydrocarbon dosing quantity, at 516. On the other hand, in response to the first leg hydrocarbon slip limit being less than the second leg hydrocarbon slip limit, the controller 170 sets the first leg hydrocarbon slip limit as the hydrocarbon dosing quantity, at 518. The method 500 then returns to operation 506.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A controller for controlling regeneration of at least one of a SCR catalyst or a filter included in a first leg or a second leg of an aftertreatment system, the first leg structured to receive a first portion of an exhaust gas produced by an engine, and the second leg structured to receive a second portion of the exhaust gas, the controller configured to:
determine whether regeneration is permitted by the engine based on engine operating parameters;
in response to determining that regeneration is permitted by the engine, determine whether regeneration is required in at least one of the first leg or the second leg based on operating parameters of the first leg and the second leg, and whether regeneration is inhibited in either the first leg or the second leg;
in response to determining that (i) regeneration is required in at least one of the first leg or the second leg, and (ii) regeneration is not inhibited in either the first leg or the second leg, cause insertion of hydrocarbons into the engine to thereby increase a temperature of the exhaust gas to a target temperature and cause regeneration in each of the first leg and the second leg;
monitor a regeneration stage of each of the first leg and the second leg; and
in response to each of the first leg and the second leg being at a regeneration stage that corresponds to a plateau stage or a regeneration stage that occurs before the plateau stage, set the target temperature as the smaller of a first target temperature of exhaust gas flowing through the first leg and a second target temperature of the exhaust gas flowing through the second leg.

2. The controller of claim 1, further configured to in response to determining that regeneration is not permitted by the engine, abort regeneration.

3. The controller of claim 1, further configured to in response to determining that regeneration is inhibited in either one of the first leg or the second leg, abort regeneration.

4. The controller of claim 1, further configured to:
in response to determining that regeneration is complete on each of the first leg and the second leg based on the monitored regeneration stage, stop causing insertion of hydrocarbons into the engine.

5. The controller of claim 1, further configured to:
determine an oxidation catalyst inlet temperature at an inlet of an oxidation catalyst included in each of the first leg and the second leg of the aftertreatment system;
in response to the oxidation catalyst inlet temperature of each of the first leg and the second leg of the aftertreatment system being greater than a light-off temperature, determine whether an estimated hydrocarbon dosing quantity of the hydrocarbons to be inserted into the engine is less than a first leg hydrocarbon slip limit of the first leg and a second leg hydrocarbon slip limit of the second leg; and
in response to the estimated hydrocarbon dosing quantity being less than each of the first leg hydrocarbon slip limit and the second leg hydrocarbon slip limit, set a hydrocarbon dosing quantity of hydrocarbons to be dosed into the engine as the estimated hydrocarbon dosing quantity.

6. The controller of claim 5, further configured to:
in response to determining that the estimated hydrocarbon dosing quantity is greater than each of the first leg hydrocarbon slip limit and the second leg hydrocarbon slip limit, determine whether the first leg hydrocarbon slip limit is greater than the second leg hydrocarbon slip limit; and in response to:
the first leg hydrocarbon slip limit being greater than the second leg hydrocarbon slip limit, set the second leg hydrocarbon slip limit as the hydrocarbon dosing quantity, or
the first leg hydrocarbon slip limit being less than the second leg hydrocarbon slip limit, set the first leg hydrocarbon slip limit as the hydrocarbon dosing quantity.

7. An aftertreatment system, comprising:
a first leg coupled to an engine and configured to receive a first portion of an exhaust gas generated by the engine, and a second leg coupled to the engine and configured to receive a second portion of the exhaust gas generated by the engine, each of the first leg and the second leg comprising:
a selective catalytic reduction catalyst,
a filter disposed upstream of the selective catalytic reduction catalyst, and
an oxidation catalyst disposed upstream of the filter; and
the controller of claim 1 coupled to sensors included in each of the first leg and the second leg.

8. The controller of claim 1, further configured to in response to one of the first leg or the second leg being at the regeneration stage that occurs before the plateau stage, and the other of the first leg or the second leg being at a regeneration stage that occurs after the plateau stage, cause increase of the target temperature to an adjusted target temperature that is greater than the smaller of the first target temperature and the second target temperature.

9. The controller of claim 8, further configured to:
determine whether the one of the first leg or the second leg which was at the regeneration stage that occurs before the plateau stage has reached the plateau stage; and
responsive to determining that the one of the first leg or the second leg has reached the plateau stage, cause maintaining of the target temperature of the exhaust gas at the adjusted target temperature until the plateau stage of the one of the first leg or the second leg is complete.

10. The controller of claim 9, further configured to in response to each of the first leg and the second leg being at the regeneration stage that occurs after the plateau stage, or an actual temperature of exhaust gas in each of the first leg and the second leg being greater than the adjusted target temperature, set the target temperature to the smaller of the first target temperature and the second target temperature.

11. The controller of claim 1, further configured to:
receive a first feedback temperature signal from a temperature sensor in the first leg and a second feedback temperature signal from a temperature sensor in the second leg to determine a first feedback temperature of the first leg and a second feedback temperature of the second leg, respectively; and
in response to determining that each of the first leg and the second leg is at a regeneration stage that occurs before a target regeneration stage of each of the first leg and the second leg, use a larger of the first feedback temperature and the second feedback temperature to control an amount of hydrocarbons inserted into the engine to cause the increase of the temperature of the exhaust gas to the target temperature.

12. The controller of claim 11, further configured to in response to determining that (i) at least one of the first leg or the second leg is at the target regeneration stage or is at a regeneration stage that occurs after the target regeneration stage, and (ii) neither of the first feedback temperature or the second feedback temperature remains above the target temperature for a first time period, use an average of the first feedback temperature and the second feedback temperature to control the amount of hydrocarbons inserted into the engine to cause the increase of the temperature of the exhaust gas to the target temperature.

13. The controller of claim 11, further configured to in response to determining that (i) at least one of the first leg or the second leg is at the target regeneration stage or at a regeneration stage that occurs after the target regeneration stage, and (ii) one of the first feedback temperature or the second feedback temperature remains above the target temperature for a first time period, use a weighted average of the first feedback temperature and the second feedback temperature to control the amount of hydrocarbons inserted into the engine to cause the increase of the temperature of the exhaust gas to the target temperature.

14. A method for controlling regeneration of at least one of a SCR catalyst or a filter included in a first leg or a second leg of an aftertreatment system, the first leg structured to receive a first portion of an exhaust gas produced by an engine, and the second leg structured to receive a second portion of the exhaust gas, the method comprising:
determining, by a controller coupled to each of the first leg and the second leg of the aftertreatment system, whether regeneration is permitted by the engine based on engine operating parameters;
in response to determining, by the controller, that regeneration is permitted by the engine, determining, by the controller, whether regeneration is required in at least one of the first leg or the second leg based on operating parameters of the first leg and the second leg, and whether regeneration is inhibited in either the first leg or the second leg;
in response to determining, by the controller, that (i) regeneration is required in at least one of the first leg or the second leg, and (ii) regeneration is not inhibited in either the first leg or the second leg, causing insertion of hydrocarbons, by the controller, into the engine to thereby increase a temperature of the exhaust gas to a target temperature and cause regeneration in each of the first leg and the second leg;
monitoring, by the controller, a regeneration stage of each of the first leg and the second leg; and
in response to each of the first leg and the second leg being at a regeneration stage that corresponds to a plateau stage or a regeneration stage that occurs before the plateau stage, setting, by the controller, the target temperature as the smaller of a first target temperature of exhaust gas flowing through the first leg and a second target temperature exhaust gas flowing through the second leg.

15. The method of claim 14, further comprising:
in response to determining, by the controller, that regeneration is complete on each of the first leg and the second leg based on the monitored regeneration stage, stopping, by the controller, insertion of hydrocarbons into the engine to stop regeneration in each of the first leg and the second leg.

16. The method of claim 14, further comprising in response to one of the first leg or the second leg being at the regeneration stage that occurs before the plateau stage, and the other of the first leg or the second leg being at a regeneration stage that occurs the plateau stage, causing, by the controller, increase of the target temperature to an adjusted target temperature.

17. The method of claim 14, further comprising:
determining, by the controller, a first feedback temperature of the first leg and a second feedback temperature of the second leg; and
in response to determining, by the controller, that each of the first leg and the second leg is at a regeneration stage that occurs before a target regeneration stage of each of the first leg and the second leg, using, by the controller, a larger of the first feedback temperature and the second feedback temperature to control an amount of hydrocarbons inserted into the engine to cause increase of the temperature of the exhaust gas to the target temperature.

18. The method of claim 14, further comprising:
determining, by the controller, an oxidation catalyst inlet temperature at an inlet of an oxidation catalyst included in each of the first leg and the second leg of the aftertreatment system;
in response to the oxidation catalyst inlet temperature of each of the first leg and the second leg of the aftertreatment system being greater than a light-off temperature, determining, by the controller, whether an estimated hydrocarbon dosing quantity of the hydrocarbons to be inserted into the engine is less than a first leg hydrocarbon slip limit of the first leg and a second leg hydrocarbon slip limit of the second leg; and
in response to the estimated hydrocarbon dosing quantity being less than each of the first leg hydrocarbon slip limit and the second leg hydrocarbon slip limit, setting a hydrocarbon dosing quantity of hydrocarbons to be dosed into the engine as the estimated hydrocarbon dosing quantity.

* * * * *